United States Patent
Oyama et al.

(10) Patent No.: US 6,634,886 B2
(45) Date of Patent: Oct. 21, 2003

(54) AMUSEMENT SYSTEM HAVING TYPE PRACTICE FUNCTION, TYPING PRACTICE SYSTEM, AND COMPUTER READABLE STORAGE MEDIUM

(75) Inventors: Sakumi Oyama, Tokyo (JP); Isato Obana, Tokyo (JP)

(73) Assignee: Konami Corporation, Tokyo (JP)

( * ) Notice: Subject to any disclaimer, the term of this patent is extended or adjusted under 35 U.S.C. 154(b) by 60 days.

(21) Appl. No.: 09/772,571

(22) Filed: Jan. 30, 2001

(65) Prior Publication Data
US 2001/0014440 A1 Aug. 16, 2001

(30) Foreign Application Priority Data
Feb. 1, 2000 (JP) ................................. P2000-028962

(51) Int. Cl.$^7$ .............................................. G09B 23/28
(52) U.S. Cl. ...................................... 434/227; 434/350
(58) Field of Search ............................. 434/227, 307 R

(56) References Cited

U.S. PATENT DOCUMENTS

| | | | | |
|---|---|---|---|---|
| 5,655,910 A | * | 8/1997 | Troudet | 434/233 |
| 6,029,214 A | * | 2/2000 | Dorfman et al. | 710/73 |
| 6,379,244 B1 | | 4/2002 | Sagawa et al. | |
| 6,388,181 B2 | * | 5/2002 | Moe | 84/470 R |
| 6,388,657 B1 | * | 5/2002 | Natoli | 345/156 |
| 6,461,239 B1 | | 10/2002 | Sagawa et al. | |

FOREIGN PATENT DOCUMENTS

| | | |
|---|---|---|
| JP | 56-134058 | 10/1981 |
| JP | 3-69113 | 10/1991 |
| JP | 8-305356 | 11/1996 |
| JP | 11-015588 | 1/1999 |
| JP | 11-015589 | 1/1999 |

OTHER PUBLICATIONS (1) Dreamcast Magazine Published May 28, 1999 p. 151.
(2) WEEKLY Famitu the extra number Published Oct. 1, 1999 p. 45.
(3) Amusement Sangyo, No. 321 Published Oct., 1998 p. 114.

* cited by examiner

Primary Examiner—Joe H. Cheng
Assistant Examiner—John Sotomayor
(74) Attorney, Agent, or Firm—Jordan and Hamburg LLP

(57) ABSTRACT

An amusement system includes a keyboard having a plurality of keys and a main control portion capable of instructing operation of the keyboard through a predetermined display device, an operation instructive portion at which a plurality of regions associated with the user's fingers are provided in a visually identifiable mode is displayed on a screen of a display device. An instructive mark for specifying a key to be operated by the finger associated with each region is displayed in the regions, respectively. The instructive mark and a predetermined reference mark are scrolled relatively in a predetermined direction, and the operation time of the key specified by each instructive mark is indicated based on a positional relationship between the instructive mark and the reference mark.

46 Claims, 20 Drawing Sheets

FIG. 7

| SET UP ROMAJI | | | | |
|---|---|---|---|---|
| あ<br>A | い<br>I | う<br>U | え<br>E | お<br>O |
| か<br>KA | き<br>KI | く<br>KU | け<br>KE | こ<br>KO |
| さ<br>SA | し<br>SI/SHI | す<br>SU | せ<br>SE | そ<br>SO |
| た<br>TA | ち<br>TI/CHI | つ<br>TU | て<br>TE | と<br>TO |
| は<br>HA | ひ<br>HI | ふ<br>HU/FU | へ<br>HE | ほ<br>HO |
| ま<br>MA | み<br>MI | む<br>MU | め<br>ME | も<br>MO |
| や<br>YA | | ゆ<br>YU | | よ<br>YO |
| ら<br>RA | り<br>RI | る<br>RU | れ<br>RE | ろ<br>RO |
| わ<br>WA | | を<br>WO | | ん<br>NN |

LIST-1
LIST-2
LIST-3
MENU

FIG. 11
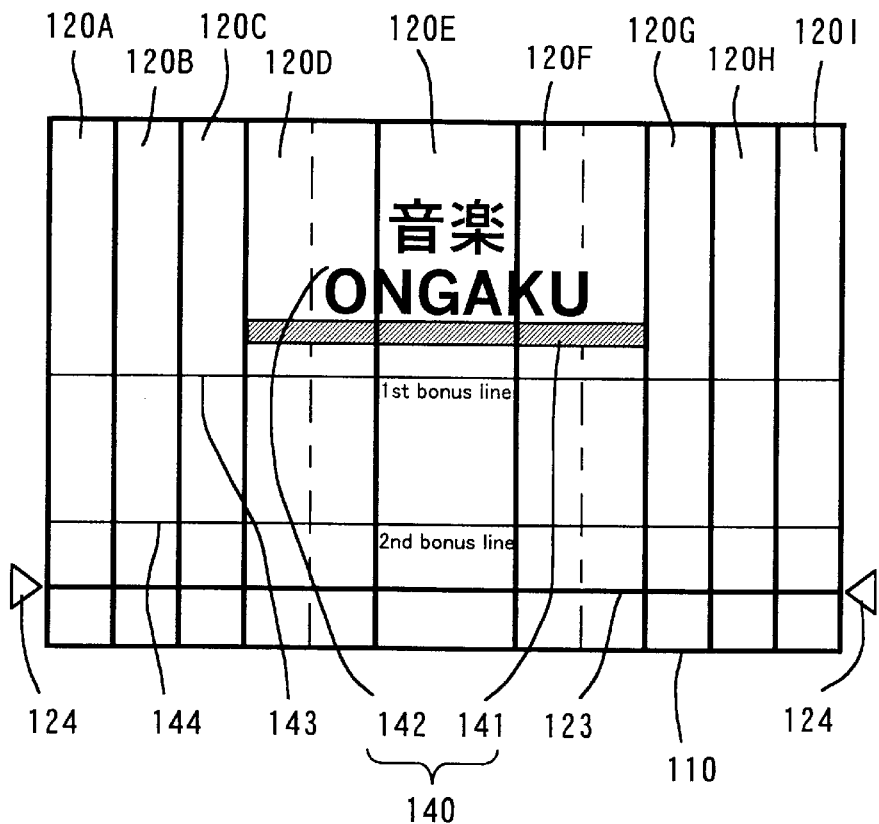
FIG. 12
(a) ONGAKU
⇩
(b) 
⇩
(c) 

FIG. 14

(a) Key typing instruction data

| Time | Key specification | Sound effect specification |
|---|---|---|

⋮

| Time | Key specification | Sound effect specification |
|---|---|---|

(b) Word typing instruction data

| Time | Word specification |
|---|---|

⋮

| Time | Word specification |
|---|---|

FIG. 15

Key assignment data

| Q A Z | Column 1 |
|---|---|
| W S X | Column 2 |
| E D C | Column 3 |
| R F V | Column 4 |
| T G B | Column 5 |
| Y H N | Column 6 |
| U J M | Column 7 |
| I K , | Column 8 |
| O L . | Column 9 |
| P ; / | Column 10 |
| Sp | Column 11 |

AMUSEMENT SYSTEM HAVING TYPE PRACTICE FUNCTION, TYPING PRACTICE SYSTEM, AND COMPUTER READABLE STORAGE MEDIUM

BACKGROUND OF THE INVENTION

1. Field of the Invention

The present invention relates to an amusement system having a typing practice function and a typing practice system.

2. Description of the Related Art

As a system of this type, there is known a system of scrolling input elements such as characters, words numeric values in a predetermined direction, and then, requesting a user to input these elements in accordance with a tempo according to the scroll (for example, refer to Japanese Utility Model Application Laid-open No. 56-134058 and Japanese Patent Application Publication No. 3-69113). In addition, in Japanese Patent Application Publication No. 3-69113, there is disclosed a system of scrolling the words of a song as input elements in accordance with a melody corresponding thereto. According to these systems, a scroll display is adopted, whereby a plurality of input elements are displayed one after another, and thus, typing practice can be continued rhythmically. Further, in Japanese Patent Application Laid-open No. 11-15589, there is disclosed a system in which information such as characters and marks is displayed in a dynamic image for a predetermined period of time, during which an input corresponding to such information is requested, thereby imparting tension to a user (hereinafter, referred to as a typist); and a game feeling is imparted to an inputting practice.

However, these typing practice systems fail to provide a user with information concerning which finger is used to type each character, and the user cannot master a manner of using fingers for typing.

In contrast, in Japanese Patent Application Laid-open No. 11-15588, there is disclosed a system in which a region corresponding to each finger by one-to-one is provided on a picture for instructing an input operation to the user, and the input elements such as characters and marks to be inputted by each finger are displayed on a region that corresponds to each finger.

The typing practice system in the aforementioned Japanese Patent Application Laid-open No. 11-15588 displays a character as an input element in any one of a plurality of regions corresponding to each finger. This system performs an alternative and intermittent display that, when such element is inputted, a next input element is displayed. Therefore, the user is not notified a next character to be inputted unless one character has been inputted. Thus, it is relatively difficult to require a continuously key operation of the user. That is, the user in a conventional typing practice system can master which key should be operated by which finger, but cannot practice well that a plurality of characters are continuously inputted by a correct typing position. In such a situation, the user cannot master typing efficiently. In addition, a monotonous instruction is likely to lack amusement and make the user bored.

SUMMARY OF THE INVENTION

In view of the aforementioned circumstance, it is an object of the present invention to provide an amusement system and a typing practice system capable of efficiently mastering typing, and further, enhancing amusement concerning typing practice.

Hereinafter, the present invention will be described. For a better understanding of the present invention, reference numerals of the accompanying drawings are designated with parentheses, which does not mean that the present invention is limited to the illustrative embodiments.

According to a first aspect of the present invention, there is provided an amusement system comprising: an input device (5) having a plurality of operating portions (50 . . . 50) to be operated for typing, the input device being capable of outputting a signal that corresponds to the operation state of each operating portion; a display device (11) capable of displaying an image that corresponds to an inputted video signal; and a control device (2) capable of instructing an operation of the input device through the display device, wherein the control device comprises: a device for displaying on a screen of the display device an operation instructing portion (111) at which a plurality of regions associated with each finger of a user who operates the input device are provided in a visually identifiable mode; a device for displaying in the respective regions an instructive mark (130) for specifying the operating portion to be operated by a finger associated with each of the regions; and a device for relatively scrolling the instructive mark and a predetermined reference mark (123) in a predetermined direction, and then, instructing an operation time of the operating portion specified by each instructive mark based on a positional relationship between the instructive mark and the reference mark.

According to this amusement system, since a region for instructing an operation for each finger is provided in a visually identifiable mode, the user can easily grasp which finger is to be used to operate for each operating portion through a relationship between the instructive mark and a region. Since the instructive mark and reference mark are relatively scrolled to indicate an operation time, it is possible to cause the user to grasp a situation in which the operation time is gradually close according to such scroll, thereby allowing the user to perform a practice in conformance with actual input environment in which the user can continue typing while grasping a future input content in advance. A plurality of instructive marks are sequentially displayed while the time is shifted relevant to each region, whereby the user can be requested to sequentially operate each operating portion with a finger that corresponds to respective regions. Therefore, there can be provided an environment in which the user can practice typing efficiently. Difficulty in operation can be changed within a relatively wide range according to disposition of instructive marks or appearance frequency thereof, and the degree of freedom concerning an instruction for operation is high, making it easy to enhance amusement concerning such instruction for operation.

In the above described amusement system, each region may be visually identified by partitioning lines (121 . . . 121) displayed on the screen, for example or may be identified by switching colors or patterns for each region. The instructive mark may be expressed in various modes such as characters or marks. The reference mark may be a reference line perpendicular to the scroll direction. The reference line may be represented to extend over a plurality of regions.

In the amusement system of the present invention, the plurality of regions may extend in parallel to each other in the predetermined direction on the screen of the display device, and the scroll may be performed in the along the predetermined direction. In such an embodiment, the plurality of regions is arranged neatly in one direction on the screen of the display device, so that the user can grasp easily an instruction for operation relevant to each finger. The predetermined direction may be a vertical direction. In the case of scrolling in the vertical direction, each region is arranged in a transverse direction, and the arrangement direction of the user's fingers placed on the input device is coincident with the region arrangement direction. Therefore, it is possible to give the user a clearer instruction for each finger.

The plurality of regions may extend in parallel to each other in a vertical direction of the screen of the display device and a display position of the reference mark may be fixed to a lower end of the operation instructing portion, so that the instructive mark may be scrolled from the top to the bottom toward the reference mark.

In general, an input device such as a personal computer is placed below the display device. Thus, if it is determined that an operating portion corresponding to such instructive mark has to be performed at a timing when the instructive mark to be scrolled from the top to the bottom of the screen reaches the reference mark at the lower end of the operation instruction portion, the user can grasp operation most naturally in view of the disposition of the display device and input device.

The plurality of regions may be arranged in the same order as the arrangement order of each finger. In this case, the user can easily grasp a correlation between each region and each finger.

Images (15A to 125I) for identifying the fingers, each of which is associated with each region, may be included in the plurality of regions, respectively. In this manner, a correlation between each region and each finger can be grasped easily and intuitively.

Images (125A to 125I), each of which simulates at least tip end of a finger associated with each region, may be displayed for the plurality of regions, respectively. In this case, the user can grasp easily and intuitively a correlation between each region and each finger.

When the operating portion of the input device is operated, at least a part of the region corresponding to the operated operating portion of the plurality of regions may be displayed in a mode different from other regions. In this case, information concerning which operating portion corresponding to which region was operated is fed back to the user, thus making it possible to easily discriminate whether or not the user has operated an operating portion correctly in accordance with the instruction of an instructive mark.

When an operating portion of the input device is operated, an image simulating at least tip end of the finger displayed in a region that corresponds to the operated operating portion of the plurality of regions may be changed. In this case as well, information concerning which operating portion corresponds to which region was operated is fed back to the user, thus making it possible to easily and intuitively discriminate whether the user has operated the operating portion correctly in accordance with the instruction of the instructive mark.

Character specific to each operating portion may be assigned one by one to the plurality of operating portions, respectively, and the instructive mark may include a mark (132) indicative of each character assigned to the operating portion to be operated. In this case, characters to be inputted can be indicated to the user easily and intuitively.

The control device may compare an operation instructed via the display device and an actual user's operation, and may display information (for example, 113a and 113b shown in FIG. 5) indicative of the evaluation result on the display device. In this case, the user can judge objectively whether or not a self-operation is proper by referring to the information indicative of the evaluation result.

The control device may sum up the evaluation for each finger in a predetermined practice range, and may cause the display device to display information according to a summation result (for example, 175a shown in FIG. 24). Further, the control device may cause the display device to display information (reference numeral 175a shown in FIG. 24) for specifying a lowest evaluated finger in the practice range as the information according to the summation result. In these cases, the user can recognize which finger is inferior in the operation, and the user can be prompted to practice such operation. Of course, a finger superior in operation may be taught.

An amusement system may comprise a sound output device (13) capable of producing a sound that corresponds to an input of a sound signal and a storage medium (15) that stores music number data for reproducing a predetermined music via the sound output device, and the control device may reproduce by the sound output device a music that corresponds to the music number data on the storage medium, and may execute the scroll for a tempo of the music in synchronism with the music. In this case, since a typing practice can be performed according to the music, it is possible to cause the user to make operation rhythmically and to make typing practice more enjoyable, to thereby attract the user's interest strongly.

When the operating portion of the input device is operated, the control device may superimpose on the music a sound effect to be harmonized therewith, and may cause such sound to be outputted from the sound output device. Thus, it is possible to cause the user to advance a typing practice while having a feeling as if he or her performs the music, to thereby eliminating resistance with respect to the typing practice while attracting the user's interest strongly.

A sound output device (13) capable of producing a sound that corresponds to an input of a sound signal may be provided, and when the operating portion of the input device is operated, the control device may cause the sound output device to output a sound that corresponds to the character assigned to the operated operating portion.

In this case, in response to an operation of the operating portion, the character assigned to that operating portion is pronounced. Thus, the user can easily grasp whether or not operation is proper from a comparison between the content of the pronunciation and the character displayed by the instructed mark.

According to a second aspect of the present invention, there is provided an amusement system comprising: an input device (5) having a plurality of operating portions (50 . . . 50) to which specific characters are assigned one by one, the input device being capable of outputting a signal that corresponds to an operation state of each operating portion; a display device (11) capable of displaying an image that corresponds to an inputted video signal; and a control device (2) capable of instructing an operation of the input device through the display device, wherein the control device comprises: a device for selecting a first practice mode or a second practice mode in accordance with a predetermined condition; a device for, in the case where the first practice mode is selected, displaying on a screen of the display device an operation instructing portion (111) at which a plurality of regions associated with each finger of a user who operates the input device are provided in a visually identifiable mode; a device for displaying in the respective regions an instructive mark (130) for specifying a character to be inputted by a finger associated with each of the regions, one by one; a device for relatively scrolling the instructive mark for specifying the character and a predetermined reference mark (123) in a predetermined direction, and then, indicating a time when the character specified for each instructive mark is to be inputted based on a positional relationship between the instructive mark and the reference mark; a device for, in the case where the second practice mode is selected, displaying on the screen of the display device an instructive mark (140) for specifying a word to be inputted by operating an operating portion of the input device several times; and a device for relatively scrolling an indicative mark for specifying the word and a predetermined reference mark (123) in a predetermined direction, and then, indicating a time limit by when the word specified by the instructive mark is to be inputted based on a positional relationship between the instructive mark and the reference mark.

According to this system, when in the first practice mode, a typing practice is performed in a manner similar to the aforementioned amusement system as the first aspect of the present invention. In this case, each character is inputted according to an instruction, so that the user can learn the position of the operating portion that corresponds to each character on the input device and the finger that should operate each operating portion. In the second practice mode, it is required to input a word by a predetermined time limit, and thus, the practice can be performed so that the word can be inputted smoothly by using a memory concerning an arrangement of the operating portion or a way to use the fingers memorized in the first practice mode. With a combination of these practice modes, the user can make typing practice efficiently from a beginner level to a high level.

In the amusement system of the second aspect, each of the instructive marks for specifying the character and the instructive mark for specifying the word may be respectively scrolled in the vertical direction of the screen of the display device. According to such an embodiment, in the case where a word including, for example, Roman characters, is expressed in a horizontal form, the character string arrangement direction is perpendicular to the scroll direction, so that a character string constituting a word can be appeared at once on the screen. Therefore, the word can be easily visualized in comparison with a case the character string is scrolled in its arrangement direction.

A sound output device (13) capable of producing a sound that corresponds to an input of a sound signal and a storage medium (15) that stores music number data for reproducing a predetermined music via the sound output device may be provided, in each of the first practice mode and the second practice mode, a music corresponding to the music number data on the storage medium may be reproduced by the sound output device, and the scroll may be executer according to a tempo of the music in synchronism with the reproduction of the music. In this case, the typing practice can be performed in time with the music. Thus, the user can make the operation rhythmically, making typing practice more enjoyable.

Further, the first practice mode and the second practice mode may be switched to each other during reproduction of one music number. In this case, the practices in accordance with the first and second practice modes are repeated alternately in time with the music, and typing can be mastered efficiently.

According to a third aspect of the present invention, there is provided a computer readable storage medium (15) applied to an amusement system configured as a computer (1) comprising: an input device (5) having a plurality of operating portions (50 . . . 50) to be operated for typing, the input device being capable of outputting a signal that corresponds to an operation state of each operating portion; a display device (11) capable of displaying an image that corresponds to an inputted video signal; and a control device (2) capable of instructing an operation of the input device through the display device, wherein a program is recorded to cause the control device to execute the steps of: displaying on a screen of the display device an operation instructing portion (111) at which a plurality of regions (120A to 120I) associated with each finger of a user who operates the input device are provided in a visually identifiable mode; displaying in the respective regions an instructive mark (130) for specifying an operating portion to be operated by a finger associated with each of the regions; and relatively scrolling the instructive mark and a predetermined reference mark (123) in a predetermined direction, and then, indicating an operation time of an operating portion specified by each instructive mark based on a positional relationship between the instructive mark and the reference mark.

According to this storage medium, it is possible to allow the computer to serve as the amusement system of the first aspect of the present invention by loading the program recorded on the storage medium into the control device and then executing it.

According to a fourth aspect of the present invention, there is provided a computer readable storage medium (15) applied to an amusement system configured as a computer (1) that comprises: an input device (5) having a plurality of operating portions (50 . . . 50) to which specific characters are assigned one by one, the input device being capable of outputting a signal that corresponds to an operation state of each operating portion; a display device (11) capable of displaying an image that corresponds to an inputted video signal; and a control device (2) capable of instructing an operation of the input device through the display device, wherein a program is recorded to cause the control device to execute the steps of: selecting a first practice mode or a second practice mode in accordance with a predetermined condition; displaying, in the case where the first practice mode is selected, on a screen of the display device an operation instructing portion (111) at which a plurality of regions (120A to 120I) associated with each finger of a user who operates the input device are provided in a visually identifiable mode; displaying in the respective regions an instructive mark (130) for specifying a character to be inputted by a finger associated with each of the regions, one by one; relatively scrolling an instructive mark for specifying the character and a predetermined reference mark (123) in a predetermined direction, and then, indicating a time when a character specified for each instructive mark is to be inputted based on a positional relationship between the instructive mark and the reference mark; displaying, in the case where the second practice mode is selected, on the screen of the display device an instructive mark (140) for specifying a word to be inputted by operating an operating portion of the input device several times; and relatively scrolling the instructive mark for specifying the word and a predetermined reference mark (123) in a predetermined direction, and then, indicating a time limit by when a word specified by the instructive mark is to be inputted based on a positional relationship between the instructive mark and the reference mark.

According to this storage medium, it is possible to allow the computer to serve as the amusement system of the second aspect of the present invention by loading the program recorded in the storage medium into the control device, and then executing it.

According to the fifth aspect of the present invention, there is provided a typing practice system comprising: an input device (5) having a plurality of operating portions (50 . . . 50) to be operated for typing, the input device being capable of outputting a signal that corresponds to an operation state of each operating portion; a display device (11) capable of displaying an image that corresponds to an inputted video signal; and a control device (2) capable of instructing an operation of the input device through the display device, wherein the control device comprises: a device for displaying on a screen of the display device an operation instructing portion (111) at which a plurality of regions (120A to 121I) associated with each finger of a user who operates the input device are provided in a visually identifiable mode; a device for displaying in the respective regions an instructive mark (130) for specifying an operating portion to be operated by a finger associated with each of the regions; a device for relatively scrolling the instructive mark and a predetermined reference mark (123) in a predetermined direction, and then, indicating an operation time of the operating portion specified by each instructive mark based on a positional relationship between the instructive mark and the reference mark.

In addition, according to the sixth aspect of the present invention, there is provided a typing practice system comprising: an input device (5) having a plurality of operating portions (50 . . . 50) operated for typing, the input device being capable of outputting a signal that corresponds to an operation state of each operating portion; a display device (11) capable of displaying an image that corresponds to an inputted video signal; and a control device (2) capable of instructing an operation of the input device through the display device, wherein the control device comprises: a device for selecting a first practice mode or the second practice mode in accordance with a predetermined condition; a device for, in the case where the first practice mode is selected, displaying on a screen of the display device an operation instructing portion (111) at which a plurality of regions associated with each finger of a user who operates the input device are provided a visually identifiable mode; a device for displaying in the respective regions an instructive mark (130) for specifying a character to be inputted by a finger associated with each of the regions, one by one; a device for relatively scrolling the instructive mark for specifying the character and a predetermined reference mark (123) in a predetermined direction, and then, indicating a time when the character specified for each instructive mark is to be inputted based on a positional relationship between the instructive mark and the reference mark; a device for, in the case where the second practice mode is selected, displaying on the screen of the display device an instructive mark (140) for specifying a word to be inputted by operating an operating portion of the input device several times; and a device for relatively scrolling the instructive mark for specifying the word and a predetermined reference mark (123) in a predetermined direction, and then indicating a time limit by when the word specified by the instructive sigh is to be inputted based on a positional relationship between the instructive mark and the reference mark.

According to these typing practice systems, an advantageous effect similar to that of the above described amusement system can be provided.

BRIEF DESCRIPTION OF THE DRAWINGS

In the accompanying drawings:

FIG. 7 is a view showing a picture displayed when a Roman character notation is selected;

FIG. 11 is a view showing the result of an operation instructing portion included in the picture shown in FIG. 6;

FIG. 12 is a view showing how display mode is changed in response to the input of a word displayed in the picture shown in FIG. 11;

FIG. 14 is a diagram showing the detail of key and word typing instruction data shown in the part (f) of FIG. 13;

FIG. 15 is a table showing the detail on key assignment data shown in the part (a) of FIG. 13;

DETAILED DESCRIPTION OF THE PREFERRED EMBODIMENTS

Figure 1:
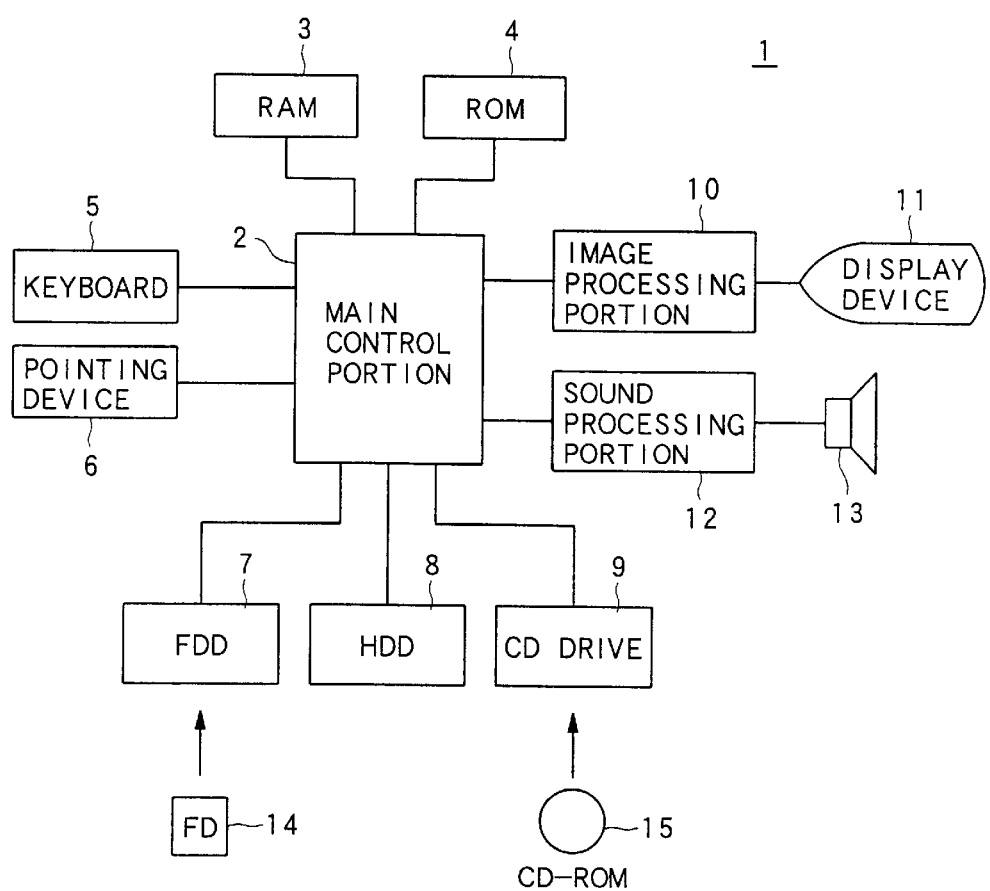
FIG. 1 is a functional block diagram showing an embodiment in which the present invention is configured as a system using a personal computer.

FIG. 1 shows an embodiment in which the present invention is configured as a typing practice system using a personal computer. As well known, a personal computer (hereinafter, abbreviated as PC) 1 comprises: a main control portion 2 having a CPU mainly constructed by microprocessors; a RAM 3 and a ROM 4 that function as main storage devices relevant to the main control portion 2; a keyboard 5 and a pointing device 6 that function as input devices relevant to the main control portion 2; an FDD (floppy disk drive) 7 that functions as an external storage device relevant to the main control portion 2; an HDD (hard disk drive) 8 and a CD drive 9; an image processing portion 10 for generating and outputting a video signal according to a drawing command from the main control portion 2; a display device 11 for displaying a video image according to an output signal from the image processing portion 10; a sound processing portion 12 for generating and outputting a sound signal according to a sound production command from the main control portion 2; and a loud speaker 13 for generating a music sound according to an output signal from the sound processing portion 12.

The keyboard 5 is configured by combining a number of keys marked with characters and symbols such as alphabetical letters from A to Z, colon (:), and period (.) in a predetermined arrangement. When each of these keys is operated, the keyboard 5 outputs a signal that corresponds to the contents of operation to the main control portion 2 as an interrupt signal. The pointing device 6 is provided for the user to specify an arbitrary coordinate on the screen of the display device 11, and a variety of devices such as mouse, trackball, slide pad and the like are used. The FDD 7 functions as an external storage device relevant to the main control portion 2 by a floppy disk 14 being mounted as a storage medium. The CD drive 9 functions as an external storage device relevant to the main control portion 2 by a CD-DOM 15 being mounted as a storage medium. The HDD 8 is well known to incorporate a magnetic disk with its large capacity and high recording density as a storage medium.

The CD-ROM 15 stores computer programs for a predetermined typing practice and data required for execution of such programs. These programs and data are installed in the HDD 8 in accordance with a predetermined installation operation relevant to the keyboard 5 or pointing device 6. The installed programs are executed under the control of a predetermined operating system. The PC 1 is functions as a typing practice system by the execution of these programs. The programs may be provided to the PC 1 via a variety of other storage media without being limited to the CD-ROM 15.

Figure 2:
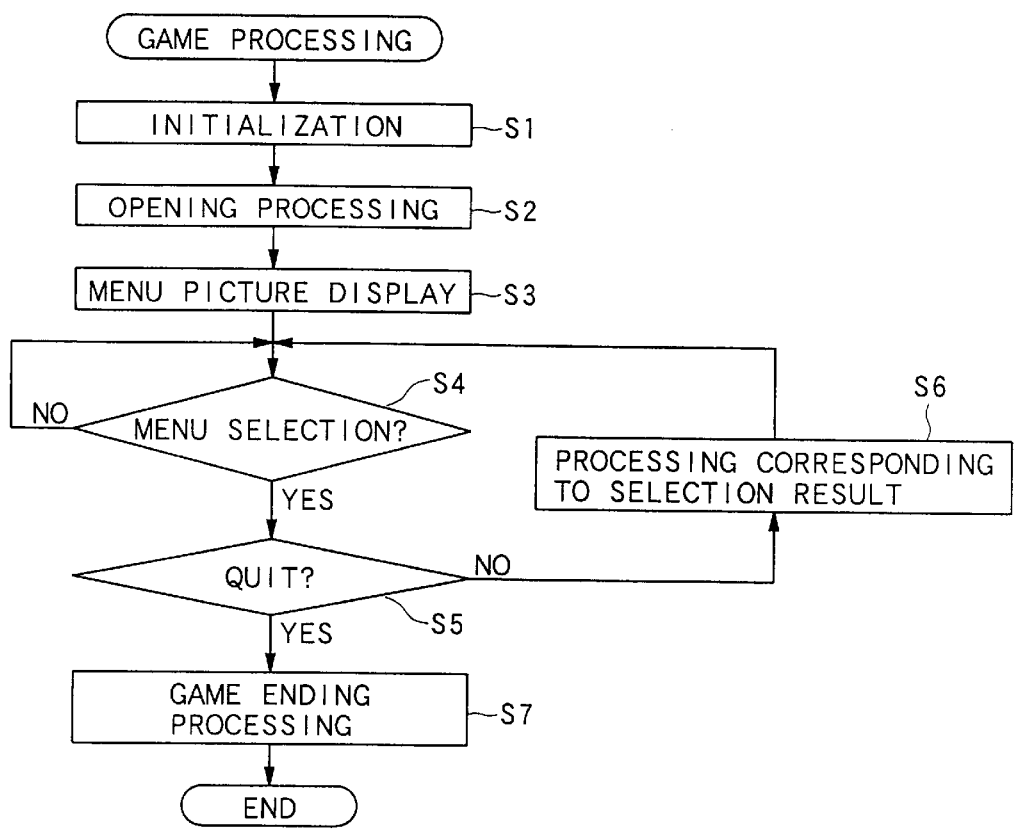
FIG. 2 is a flowchart showing procedures for game processing for typing practice executed in the system shown in FIG. 1.
Figure 3:
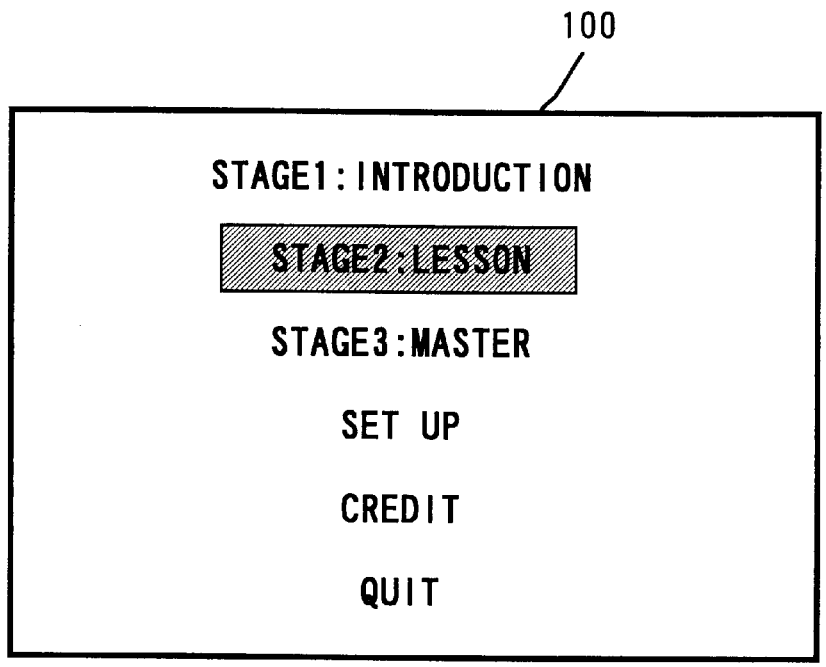
FIG. 3 is a view showing a menu picture displayed in the processing show in FIG. 2.

FIG. 2 is a flowchart showing a flow of a typing practice game executed by the installed typing practice programs. When a user of the PC 1 performs a predetermined operation, a game is started, and a menu picture is displayed (step S3) through predetermined initialization processing (step S1) and opening processing (step 2) such as movie display. As shown in FIG. 3, a menu picture 100 contains "STAGE 1", "STAGE 2", "STAGE 3", "SET UP", "CREDIT", and "QUIT" as items that the user can select. When the keyboard 5 or pointing device 6 is operated while a menu picture 100 is displayed, and any one item is selected from the menu picture 100, it is judged whether or not the selected items are the QUIT (steps S4 and S5). If the result is not the QUIT, the processing is reverted to the step 4 through processing (step S6) that corresponds to the selected item. In the case where the QUIT is selected, game ending processing is executed (step S7), and then the game is terminated after this processing has been completed.

In the case where the "STAGE 1" is selected from the menu picture 100 shown in FIG. 3, basic knowledge concerning keyboard operation is guided to the user in accordance with predetermined procedures. For example, correct posture during keyboard typing, home position, a correlation between keys and fingers, a manner of moving the fingers and the like are guided through the picture of the display device 11 and a sound from the loud speaker 13.

Figure 4:
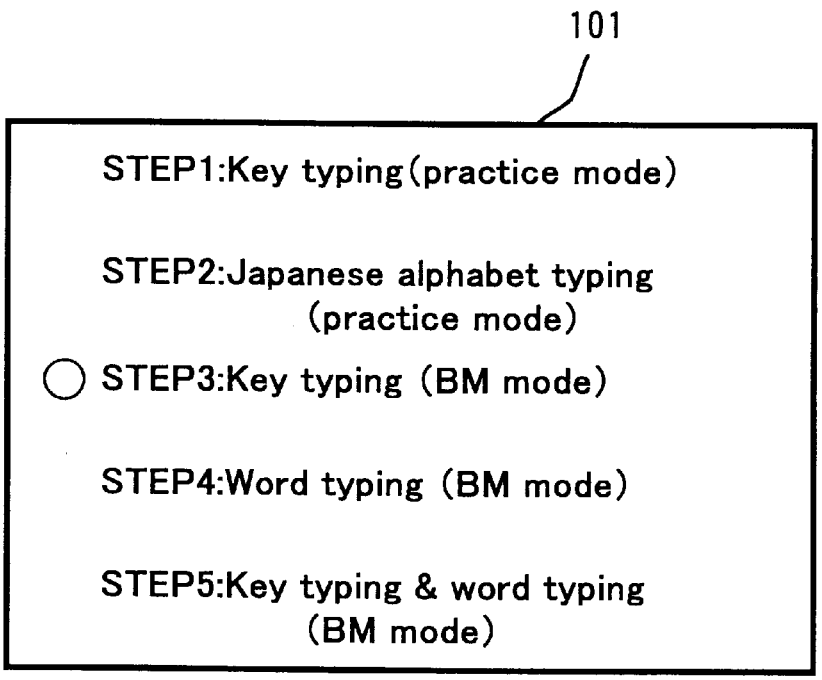
FIG. 4 is a view showing a picture called from the menu picture shown in FIG. 3.

In the case where the "STAGE 2" is selected from the menu picture 100 shown in FIG. 3, a menu picture 101 shown in FIG. 4 is displayed. Five items of "STEP 1" to "STEP 5" are provided as a selection candidate on the menu picture 101. When the user selects one from among these items, the typing practice corresponding to the selected item is performed. In the case where the key typing (practice mode) is selected at the "STEP 1", one alphabetical letter is randomly displayed on the screen of the display device 11 (FIG. 1). Practice is performed in accordance with procedures in which, after the user presses the key corresponding to such character, a next character is displayed. When the Japanese alphabet typing (practice mode) is selected at the "STEP 2", one or more Roman characters corresponding to one Hiragana character are displayed on the screen instead of one character at the "STEP 1". Then, practice is performed in accordance with procedures in which, when the user inputs these characters, the next roman characters are displayed. These practice methods are similar to those adopted in a conventional practice system.

Figure 5:
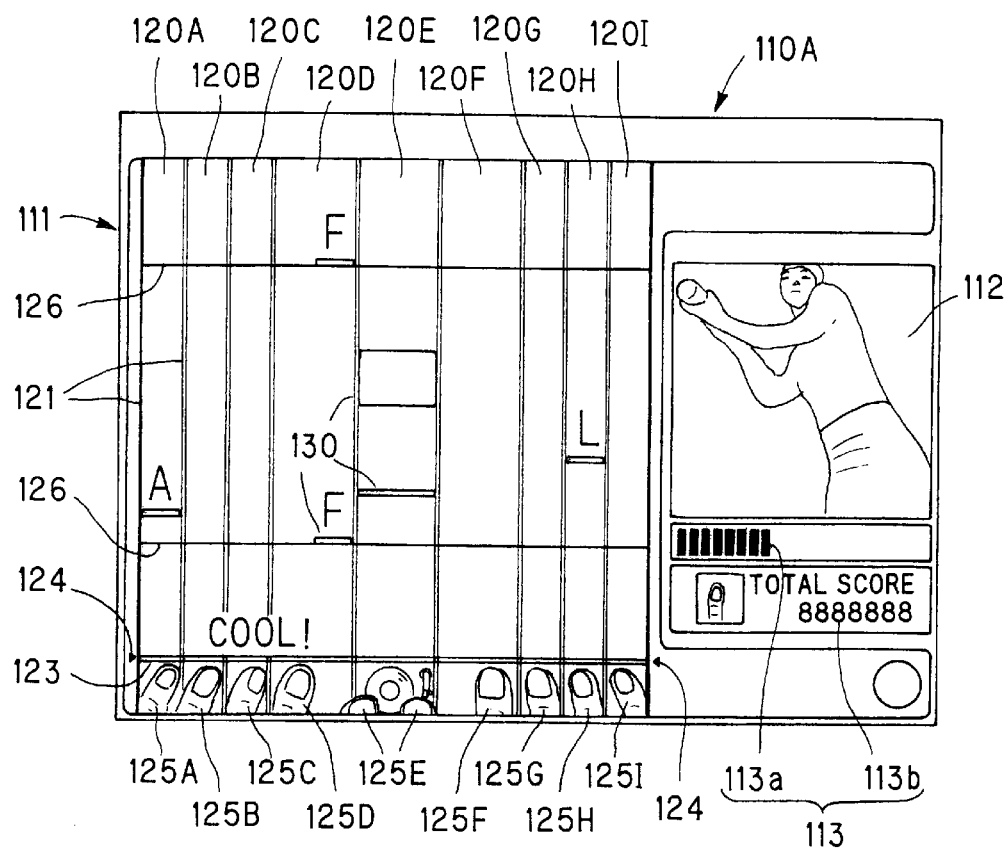
FIG. 5 is a view showing a picture when the typing practice is performed.

In the case where the "key typing (BM mode)" is selected at the "STEP 3", practice is performed in accordance with procedures in which the user inputs alphabetical letters one by one in accordance with an instruction supplied by using a game picture 110A shown in FIG. 5. In the case where the "word typing (BM mode)" is selected at the "STEP 4", practice is performed in accordance with procedures in which the user inputs a predetermined word by the Roman characters in accordance with an instruction supplied by using a game picture 110B shown in FIG. 6. In the case where the "key typing & word typing (BM mode)" is selected at the "STEP 5", practices of the "key typing" at the "STEP 3" and the "word typing" at the "STEP 4" are repeated alternatively. In the practices at the STEP 1 to the STEP 5, a predetermined music is reproduced as a BGM. The user can perform typing rhythmically in accordance with such music.

In the case where the "STAGE 3" is selected from the menu picture 100 shown in FIG. 3, as in the STEP 5 of the STAGE 2, typing practice is performed by alternately repeating the "key typing" and the "word typing". However, at the STAGE 3, a plurality of music numbers is provided as the BGM. The user performs typing practice in accordance with procedures defined for each music number, whereby the typing practice is performed in a game style such that the user challenges operations with gradually higher difficulties.

In the case where the "SET UP" is selected from the menu picture 100 shown in FIG. 3, a setup picture 102 shown in FIG. 7 is displayed. The user can set a Hiragana expression rule based on Roman characters preferably through this picture 102. The Hiragana expression rule based on Roman characters includes standard style, Japanese style, and Kunrei style. Which of these styles should be followed to make entry depends on the user. In the setup picture 102 shown in FIG. 7, expressions that can be selected in correction with the Hiragana characters in which a plurality of expressions exist are presented, so that the user can select a desired expression. Specifically, "SI" and "SHI" are presented for Hiragana character "し"; "TI" and "CHI" are presented for "ち", and "HU" and "FU" are presented for "ふ". When the user operates the pointing device 6 (refer to FIG. 1) to move a cursor 103 on a desired expression, and a predetermined selection operation (for example, click operation of the pointing device 6) is performed in this state, such expression is selected. The selection result is stored as an environment setting file in the HDD 8. During the typing practice, the environment setting file is loaded in the RAM 3, and an input command is performed based on the contents of such file. For example, in the case where "SHI" is selected for "し", when an input of "し" is required, "SHI" is displayed on the screen of the display device 11. The setup picture 102 is configured to be divided into three pages of "LIST-1", "LIST-2", and "LIST-3" as indicated at its lower right, and any page is alternately displayed according to user selection operation.

Figure 6:
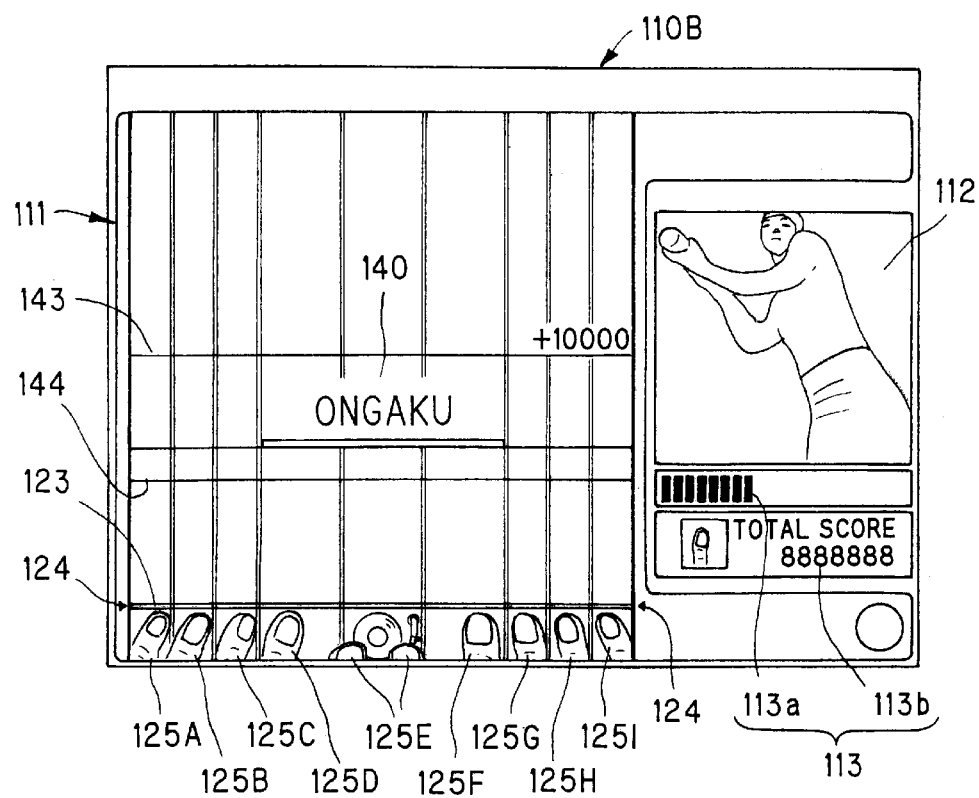
FIG. 6 is a view showing another picture when the typing practice is performed.

As described above, in the present embodiment, in the case where the "STAGE 2" or the "STAGE 3" shown in FIG. 3 is selected, the user performs the typing practice according to an instruction supplied through the display device 11. Any of modes other than the "STEP 1" and the "STEP 2" shown in FIG. 4 is common in that practice is performed by using the pictures 110A and 110B shown in FIGS. 5 and 6. The picture 110A shown in FIG. 5 is a picture displayed when the "key typing practice" is performed; and the picture 110B shown in FIG. 6 is a picture displayed when the "word typing" practice is performed. Hereinafter, the typing practices using these pictures 110A and 110B will be described in detail.

As shown in FIGS. 5 and 6, the game pictures 110A and 110B each has an operation instructing portion 111; a video display portion 112; and an evaluation display portion 113. The operation instructing portion 111 is used to indicate a key or a word that the user should input. In the video image display portion 112, video images such as movies, animation and still images are displayed according to the BGM produced during the practice. Although these video images are mainly intended to have a visual performance effect on the typing practice, an image for displaying advice or the like to the user may be displayed on the video image display portion 112. The evaluation display portion 113 is used to indicate an evaluation relevant to the typing practice of the user. At the evaluation display portion 113, a bar graph shaped gauge 113*a* and a score meter 113 are provided as means indicative of the evaluation. The gauge 113*a* indicates a score acquired by the user in the typing practice, and the score is replaced by a length to the right with the left end of the gauge 113*a* being defined as a standard. The more right side the gauge 113*a* extends, the higher the score is obtained. The user's score is digitally indicated by the score meter 113*b*. The higher evaluation is obtained relevant to the user operation, the higher score is obtained.

Figure 8:
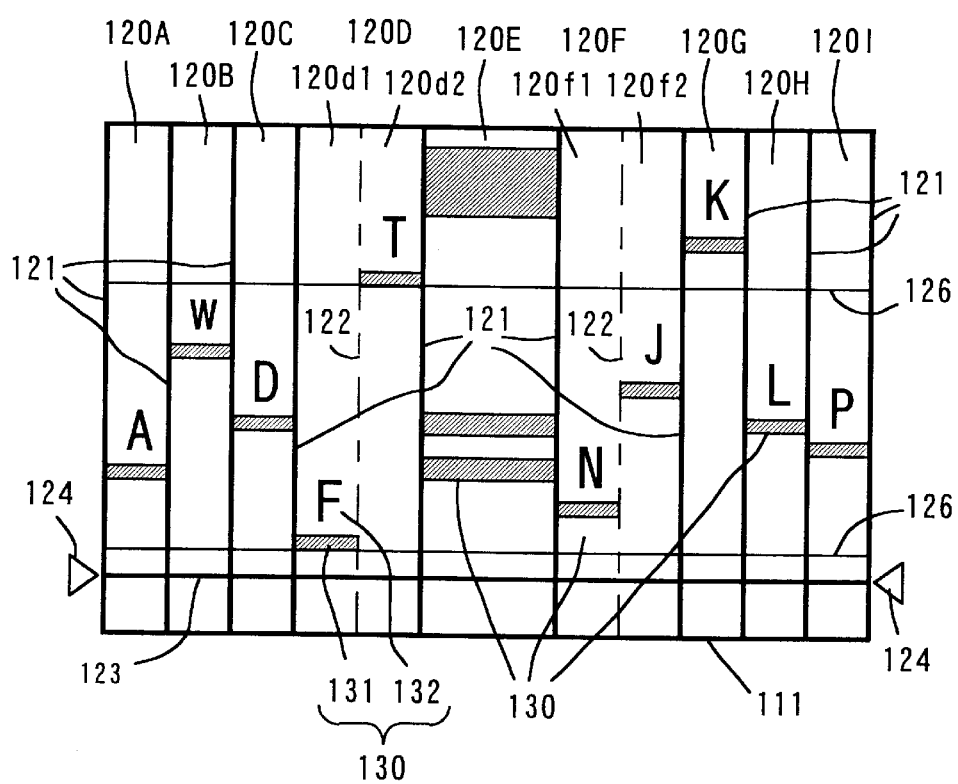
FIG. 8 is a view showing the detail on an operating instructing portion included in the picture shown in FIG. 5.

FIG. 8 shows the detail of an operation instructing portion 111 of the game picture 110A shown in FIG. 5. As is evident from these figures, nine instructive regions 120A to 120I that extend in a vertical direction are provided at the operation instructing portion 111. The instructive regions 120A to 120I are visually divided from each other by partition lines 121 ... 121 displayed on the screen of the display device 11. Namely, the user can identify the regions 120A to 120I by referring to these partition lines 121.

From the left end of the operation instructing portion 111, the four instructive regions 120A, 120B, 120C, and 120D are provided as regions that correspond to the little finger, the third finger, the middle finger, and the index finger of the user's left hand, respectively. In addition, from the right end of the operation instructing portion 111, the four instructive regions 120I, 120H, 120G, and 120F are provided as regions that correspond to the little finger, the third finger, the middle finger, and the index finger of the user's right hand, respectively. The center instructive region 120E is provided as a region that corresponds to the user's right and left thumbs in common. The instructive regions 120D and 120F that correspond to the left and right index fingers can be further identified into small regions 120*d*1, 120*d*2, 120*f*1, and 120*f*2. Although the boundary of these small regions is indicated by alternately dotted chain lines 122, 122, as is evident from FIG. 5, the alternately dotted chain line 122 is not displayed on an actual picture 110A. However, the alternately dotted chain line 122 may be displayed in mode that is visually identifiable from the partition line 121.

Figure 9:
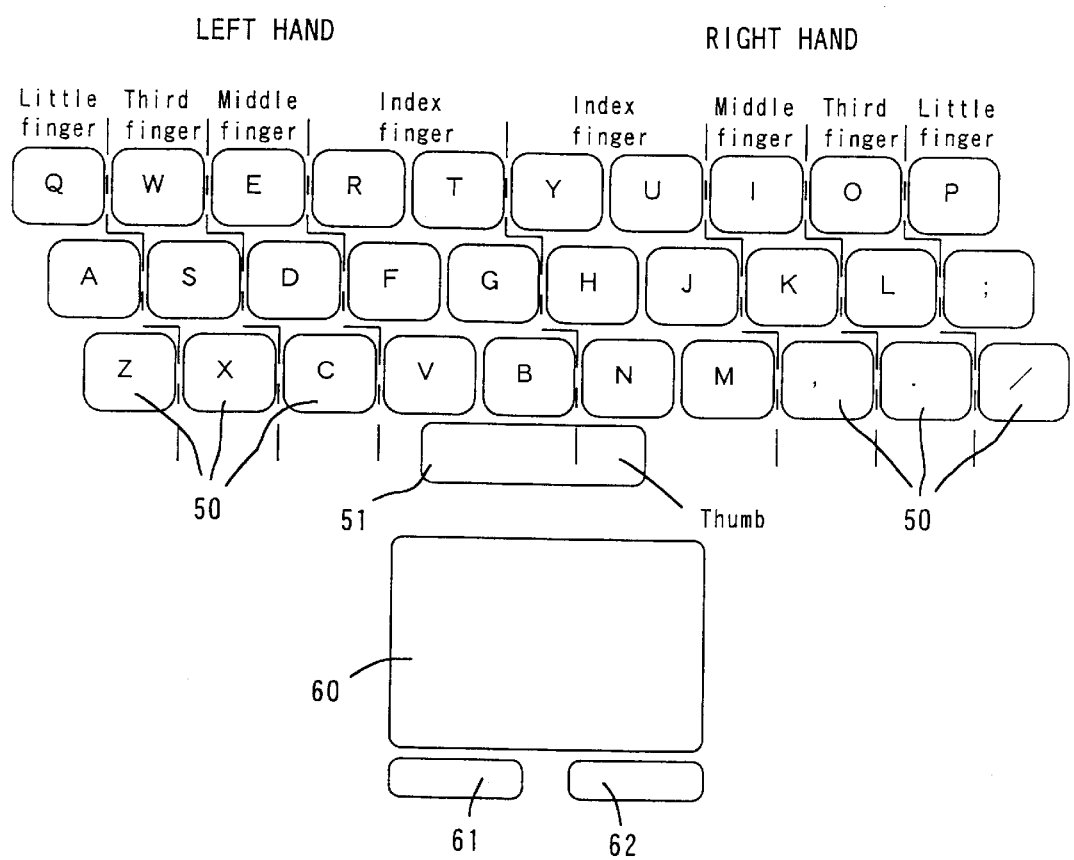
FIG. 9 is a view showing key arrangement of a keyboard associated with the operating portion shown in FIG. 8.

As shown in FIG. 9, a correlation between each of the character keys (including keys assigned signs such as period) of the keyboard 5 and each finger is predetermined. Thus, the instructive regions 120A to 120D and 120F to 120I each has a correlation with a character key 50 of the keyboard 5 via a relation with fingers. That is, the instructive region 120A are associated with "Q", "A", and "Z"; the instructive region 120B are associated with "W", "S", and "X"; the instructive region 120 is associated with "E", "D", and "C"; the instructive region 120D is associated with "R", "F", "V", "T", "G", and "B"; the instructive region F is associated with "Y", "H", "N", "U", "J", and "M"; the instructive region 120G is associated with "I", "K", and "," (comma); the instructive region 120H is associated with "O", "L", and "." (period); and the instructive region 120I is associated with "P", ";" (semicolon), and "I", respectively.

Although two-array character keys 50 on the keyboard 5 are assigned to an index finger, the keys 50 in each array are further associated to the small regions 120*d*1, 120*d*2, 120*f*1, and 120*f*2, respectively. That is, "R", "F", and "V" are associated with the small region 120*d*1; "T", "G", and "B" are associated with the small region 120*d*2; "Y", "H", and "N" are associated with the small region 120*f*1; and "U", "J", and "M" are associated with the small region 120*f*2, respectively. Since the character keys 50 are not generally assigned to a thumb, for example, a space key 51 can be associated. In a notebook-type personal computer, if a slide pad 60 is provided as the pointing device 6 in front of the keyboard 5, the slide pad 60 or associated click buttons 61 and 62 may be associated with the instructive region 120E.

As shown in FIG. 8, a judgment reference line 123 that extends in a transverse direction is displayed at the lower part of the operation instructing portion 111, and reference marks 124, 124 are displayed at both ends of the judgment reference line 123. Further, as is evident from FIG. 5, images 125A to 25I expressing finger tips are displayed respectively as images for identifying the fingers associated with the instructive regions (refer to FIG. 5). However, as the images for identifying the corresponding fingers, characters or symbols maybe displayed instead of or in addition to the images 125A to 125I of the finger tips.

Further, when the "key typing" practice is performed, key instructive marks 130 ... 130 are displayed in the display regions 120A to 120I. Each of these key indicative marks 130 includes a reference mark 131 extending in the horizontal direction, and further, the key instructive marks 130 in each of the instructive regions 120A to 120D and 120F to 120I except the indicative region 120E corresponding to the thumb includes a character mark 132. The reference mark 131 is an image for indicating a time when a key should be operated by a finger associated with each of the instructive regions 120A to 120I, and a character mark 132 is an image for specifying a key to be operated at a time indicated by the character mark 131. A character displayed by the character mark 132 is selected from among characters of keys 50 associated with the respective instructive regions 120A to 120D and 120F to 120I in which the character marks 132 are displayed.

Each key instructive marks 130 appears at the top end of each of the instructive regions 120A to 120I at a predetermined time. After these marks have appeared, they are scrolled downward at a speed according to the tempo of the BGM that is supplied during the practice. When the reference mark 131 reaches the judgment reference line 123, an operation time concerning such reference mark 131 comes. Operation of keys specified by the character marks 132 paired with the reference mark 131 according to the time is requested to the user. The more faithfully the user makes operation in accordance with an instruction, the higher the user's operation is evaluated. As a result, the evaluation displayed at the evaluation display portion 113 shown in FIG. 5 is increased.

From the foregoing, three items of information concerning key operation time, types of keys to be operated, and fingers to be used for operation are provided to the user. For example, in the case where the key instructive mark 130 represented in the region 120A includes the character mark 132 indicative of alphabetical letter "A", the user is instructed to operate the key of the alphabetical letter "A" by the little finger of the left hand when the reference mark 131 of the key instructive mark 130 reaches the judgment reference line 123.

Figure 10:
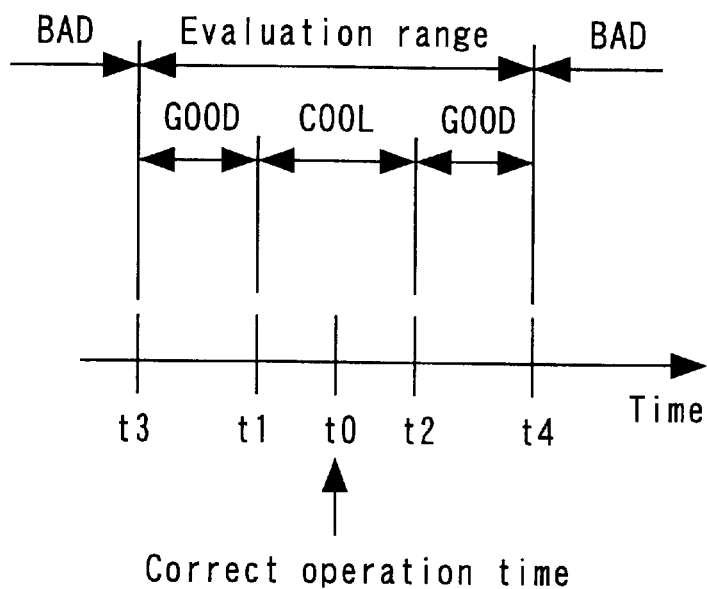
FIG. 10 is a view illustrating an evaluation method relevant to an operation instruction using the picture shown in FIG. 8.

During the "key typing" practice, user operation is evaluated based on a difference between an instruction from the operation instructing portion 111 and actual user operation. That is, as shown in FIG. 10, in the case where a correct operation time t0 is defined with respect to a specific key, a range with its predetermined width (t3 to t4) is set as an evaluation range, before and after the operation time t0. Further, a COOL evaluation range t1 to t2 is set at the center of the evaluation range, and GOOD evaluation ranges t3 to t1 and t2 to t4 are set respectively at both ends thereof. A range before and after the evaluation range is set as a BAD range. When the user operates any key from the keyboard 5, the actual operation time concerning such key is compared with a time that is closest to that actual operation time among the predetermined operation times concerning the same key. Then, it is judged which range is used to include the actual operation time relevant to the predetermined operation time (operation time indicated by the key instructive mark 130). Depending on the COOL, GOOD, or BAD range, the corresponding character "COOL", "GOOD", or "BAD" is displayed near the judgment reference line 123 (FIG. 5 shows a state in which "COOL!" is displayed). Then, the length of the gauge 113a of the evaluation display portion 113 and the score displayed on the score meter 113b are increased or decreased according to these evaluations. For example, when the actual operation time is within the evaluation range, the score is increased. In contrast, when it is out of the evaluation range, the score is decreased. An evaluation range may not be provided equally relevant to the correct operation time t0, and may be provided in one-sided manner. In FIGS. 5 and 8, bar partitioning lines 126, 126 in the horizontal direction are displayed in order to indicate partitioning for each bar of the music number used as the BGM.

On the other hand, as shown in FIG. 11, when the "word typing" practice is performed, the key instructive mark 130 for each of the above mentioned instructive regions 120A to 120I is not displayed, and instead, a word instructive mark 140 is displayed. The word instructive mark 140 includes a reference mark 141 and a word mark 142. The reference mark 141 is an image for indicating the time limit of word input, and has a length in the horizontal direction according to a word to be inputted. The word mark 142 is an image for specifying the word to be inputted. The word mark 142 is configured to be indicated with the word to be inputted at two stages, i.e., top and bottom stages, in Japanese and Roman characters. Further, on the game picture 110B displayed when the word typing is performed, a first bonus line 143 and a second bonus line 144 are displayed in parallel to the judgment reference line 123, respectively, at the upper side of the judgment reference line 123.

The word instructive mark 140 appears at the upper end of the operation instructive portion 111 and at the center in the transverse direction of the operation instructing portion 111 at a predetermined time during practice. After the mark has appeared, it is scrolled downward at a speed according to the tempo of the BGM supplied during the practice. When the user inputs all alphabetical letters represented on a word mark 142 until the reference mark 141 has reached the judgment reference line 123, such input is handled as being successful. Otherwise, the input of such word is handled to have failed. The evaluation displayed at the evaluation display portion 113 shown in FIG. 6 changes according to whether or not the input is successful. For example, in the case of success, the score is increased by a predetermined quantity, and in the case of failure, the score is decreased by a predetermined quantity. When the input has completed until the reference mark 141 has reached the first bonus line 143 or the second bonus line 134, such user operation is evaluated more highly, and the bonus according to such evaluation is added. In FIG. 6, an image indicating that the word input is completed until the score has reached the first bonus line 143, and then, 10000 points are added as a bonus for the result is displayed at the right end of the first bonus line 143. As shown in the parts (a) to (c) of FIG. 12, a display mode (for example, color, contrast, or pattern and the like) of the character is changed every time alphabetical letter indicated by the word mark 142 has been inputted, whereby the user is notified as to the input progress condition. In FIG. 11, although not shown, images 125A to 125I of finger tips are displayed at the lower side of the judgment reference line 123 during the "word typing" practice as well (refer to FIG. 6).

Figure 13:
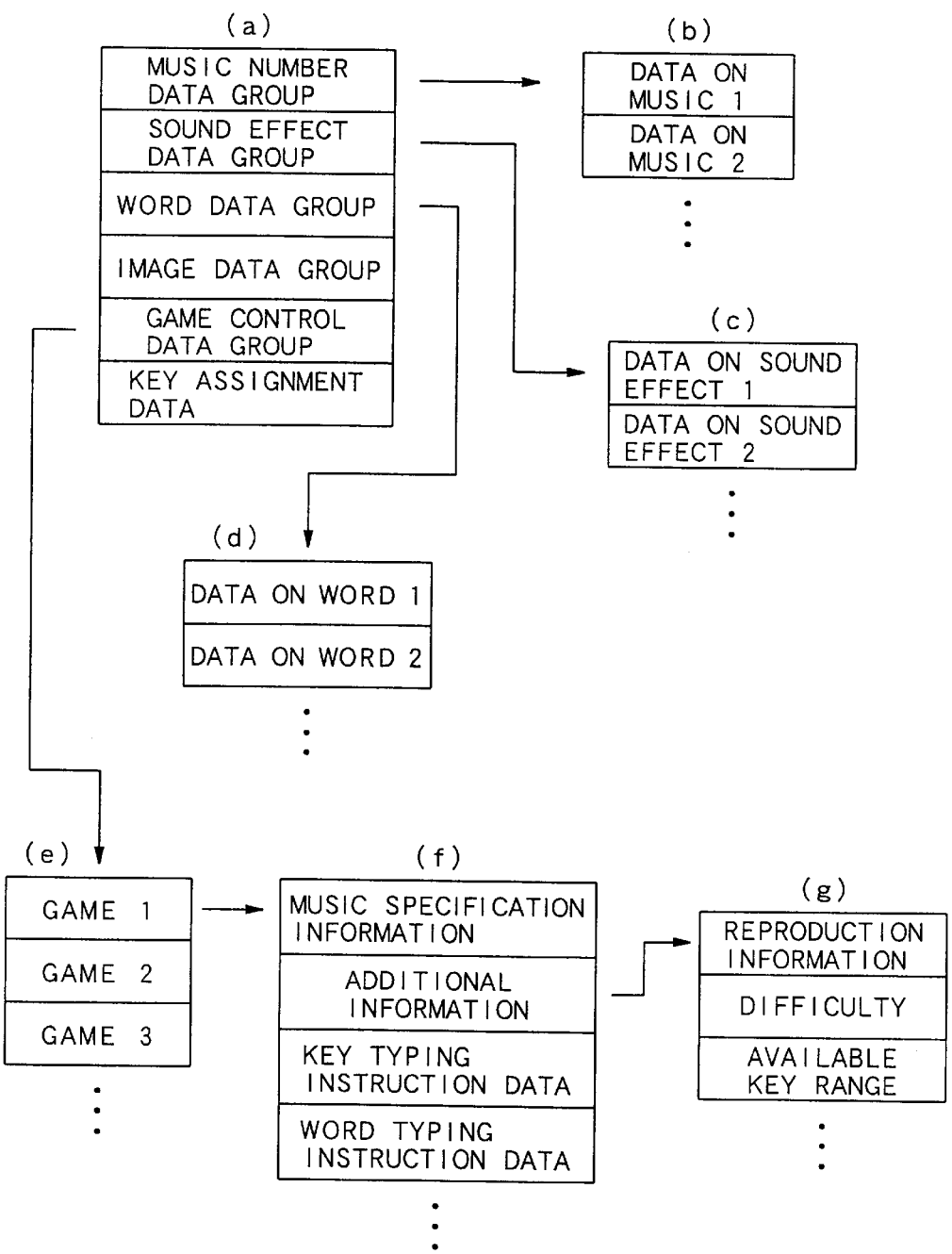
FIG. 13 is a diagram showing an example of a structure of data provided in advance to perform the typing practice.

FIGS. 13 and 14 show an example of data recorded in advance in the CD-ROM 15 (refer to FIG. 1) in order to achieve the above practices of the "key typing" and the "word typing", respectively. However, the data structure shown below is provided as an example, the contents of which may be variously changed according to program creation or convenience for execution.

As shown in the part (a) of FIG. 13, there are recorded on the CD-ROM 15 music number data group, sound effect data, word data group, image data group, game control data group, and key assignment data. As shown in FIG. 13(b), the music data group includes a plurality of items of music number data for reproducing the BGM during the typing practice. The data on each music number is recorded in a CD-DA format, for example. The data on each music number is directly outputted from the CD drive 9 to the sound processing portion 12 when receiving are production instruction from the main control section 2. The outputted data is subject to processing such as D/A conversion and the like at the sound processing portion 12, and is converted into a sound signal that can be outputted from the loud speaker 13.

As shown in the part (c) of FIG. 13, a sound effect data group contains data on a plurality of sound effects to be outputted according to key operation. The data on each sound effect is created as PCM data or MIDI data, for example. As the sound effects, there may be used a variety of sounds such as music instrument sounds, voice, or clapping and the like according to the BGM. However, in order to utilize features of typing practice software, as the sound effect data, it is desirable to provide data for voice that reads characters assigned to each of the keys of the keyboard 5, i.e., data for announcing alphabetical letters A, B, C . . . .

As shown in the part (d) of FIG. 13, a word data group contains data defining each of the words to be required through the picture 110B for the user to make input. The data is separately prepared for each word, for example, the data of a word 1 is prepared for a word "音楽/ONGAKU"; and the data of a word 2 is prepared for a word "東京/TOKYO". Additional information such as difficulty may be provided for each word. The data on each word may be generated as character data for specifying ASCII code, font, and size of each character.

An image data group shown in the part (a) of FIG. 13 is a set of data on a variety of images used in a game (for example, an image of reference marks 131 and 141 and an image to be displayed on a video image display portion 112).

As shown in the part (e) of FIG. 13, a game control data group contains a plurality of game data sets created by each game. The data for each game specifies the contents of one type practice to be executed to be associated with any one of the above mentioned music number data. As shown in the part (f) of FIG. 13, the data for each game contains music number specification information, additional information, key typing instruction data, and word typing instruction data. The data for each game contains information for specifying image data to be used at each scene in respective games, the illustration of which has been omitted here.

The music specification information is information for specifying music number data to be reproduced to be associated with the game data. In specifying a music number, it is possible to specify a storage position of the music number on the CD-ROM 15 by designating sector numbers corresponding to the head and rear ends of that music, respectively. A number may be assigned to each music number data, a table for specifying a relationship between the number and the storage position thereof on the CD-ROM 15 may be created in advance, and only the number may be specified in music specification information.

As shown in the part (g) of FIG. 13, the additional information is information indicative of the detail on a game (typing practice) to be executed for the game data. For example, music reproduction information associated with music reproduction such as music title or performance length, ending position, and tempo or information for specifying difficulty of such music number or range of character key in which input is requested according to the music is recorded as the additional information. In the case where the practice of the "key typing" and the "word typing" are switched to each other in the middle, of the music, information for specifying the switching time may be included as the additional information.

The key typing instruction data shown in the part (f) of FIG. 13 is data that defines the contents of operation of the keyboard 5 to be indicated for the user through the operation instructing portion 111 when the "key typing" practice is performed. This data can be configured as shown in the part (a) of FIG. 14, for example. In this example, one set of data is configured by combining: information for specifying a time when a key should be operated; information for specifying a key to be operated at that time; and information for specifying a sound effect to be outputted according to that operation, and the data is configured to be provided in plural sets. One set of data corresponds to one of the key instructive marks 130. That is, a time when the reference mark 131 of the key instructive mark 130 reaches the judgment reference line 123 is specified based on the information for specifying the operation time, and the contents of the character mark 132 to be displayed in combination with the instructive mark 130 is specified based on the information for specifying the key. A sound effect to be produced when a key specified by the character mark 132 is pressed according to a timing at which the reference mark 131 reaches the judgment reference line 123 is specified based on the information for specifying the sound effect.

In the key typing instruction data, the operation time is managed as follows, for example. That is, each music number is divided by the resolution of 32 divisions for one bar, and serial numbers are assigned from the start of the music to these divided sections, whereby the serial number is used so that a specific position in the music can be specified. For example, when a number 1 of the section at the start of the music is assigned, the first section of the second bar can be specified by serial number 33. The operation time may be specified according to an elapsed time from the start of performance of the BGM, or sector number on the CD-ROM 15 corresponding to the operation time, or the like. A key may be specified by defining the number specific to a key in advance, or may be specified by a code (for example, ASCII code) that corresponds to the character assigned to each key of the keyboard 5. The sound effect data is information for specifying any sound effect data from the sound effect data group shown in FIG. 13(a).

On the other hand, the word typing data shown in FIG. 13(f) is data that defines the contents of operation of the keyboard 5 to be indicated for the user through the operation instructing portion 111 when the "word typing" practice is performed. This data can be configured as shown in FIG. 14(b), for example. In this example, one set of data is configured by combining information for specifying a time of word input and information for specifying a word to be inputted by that time from among the word data group in FIG. 13(a), and the data is configured to be provided in plural sets. The designation or specification of the operation time is as described above.

Further, the key assignment data shown in the part (a) of FIG. 13 is data for describing a correlation between each key of the keyboard 5 and each region for the operation instructing portion 111. This data is configured as shown in FIG. 15, for example. In the example shown in FIG. 15, a display column 1 corresponds to the region 120A shown in FIG. 8; a display column 2 corresponds to a region 120B; a display column 3 corresponds to a region 120C; a display column 4 corresponds to a region 120d1; a display column 5 corresponds to a region 120d2; a display column 6 corresponds to a region 120f1; a display column 7 corresponds to a region 120f2; a display column 8 corresponds 120G; a display column 9 corresponds to a region 120H; a display column 10 corresponds to a region 120I; and a display column 11 corresponds to a region 120E, respectively. A key "Sp" indicates a space key 51 (refer to FIG. 9).

In the information for specifying a key shown in the part (a) of FIG. 14, any of information for specifying a specific key and information for specifying a selection from a predetermined range of keys can be described. In the case where the latter information is specified, the main control portion 2 selects an arbitrary character as a key to be operated at the operation time, and can determine the display columns of the key instructive mark 130 of the operation instructing portion 111 or the contents of the character mark 132 according to the selection result. By enabling such processing, two or more kinds of operations can be alternately instructed by using the same key typing instruction data, and monotonous properties caused by repetition of the same input instruction can be eliminated.

In the above example, the word data and the image data are provided to be discriminated from a game control data group, and the date to be used in each game control data is specified therefrom. However, in the case where the word data and the image data to be used for each music number are different from each other, the word data or the image data may be contained in the game control data for each music number. In that case, in the word typing instruction data, the data on the word to be displayed may be described to be associated with the time when the data is inputted, instead of the specification of the word or the image data.

Now, processing executed by the main control portion 2 for the above mentioned "key typing" and "word typing" practices will be described with reference to FIGS. 16 to 21.

Figure 16:
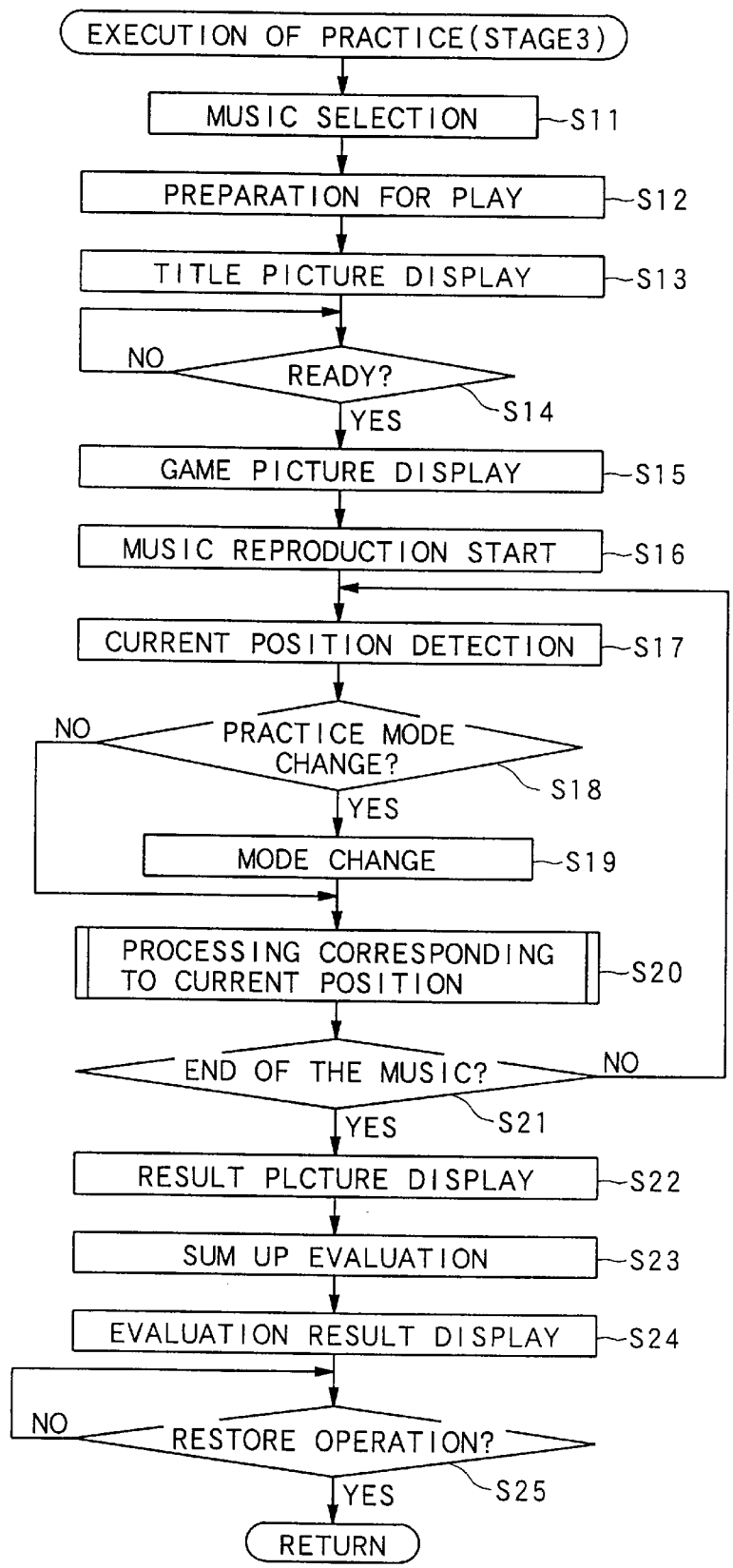
FIG. 16 is a flowchart showing procedures for practice execution processing executed by a main control portion shown in FIG. 12.
Figure 22:
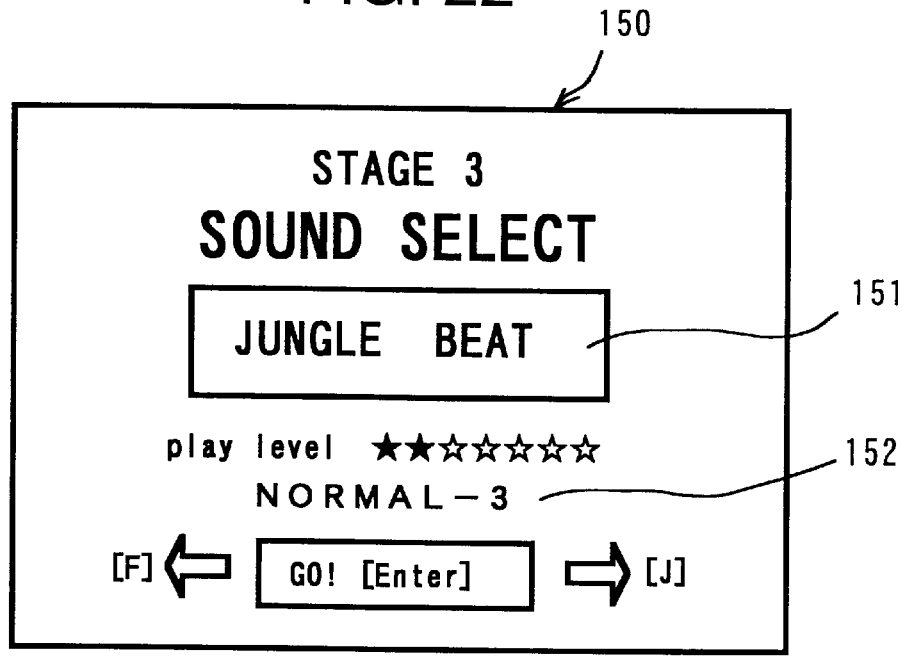
FIG. 22 is a view showing a picture displayed for music number selection when the processing shown in FIG. 16 is executed.

FIG. 16 shows procedures for practice execution processing executed by the CPU of the main control portion 2 in the case where the "STAGE 3" is selected from the above described menu picture 100 shown in FIG. 3. In this processing, there is performed processing for causing the user to select a music number targeted for play via a predetermined music selection picture. At this time, the music selection picture can be configured as shown in a picture 150 shown in FIG. 22, for example. This picture 150 displays information such as music number 151 during selection, the associated difficulty 152 or the like. When the user makes a predetermined selection and change operation for the keyboard 5, the music number is changed. When the user makes a predetermined determination operation, the music number in selection is determined as a music number to be played.

Figure 23:
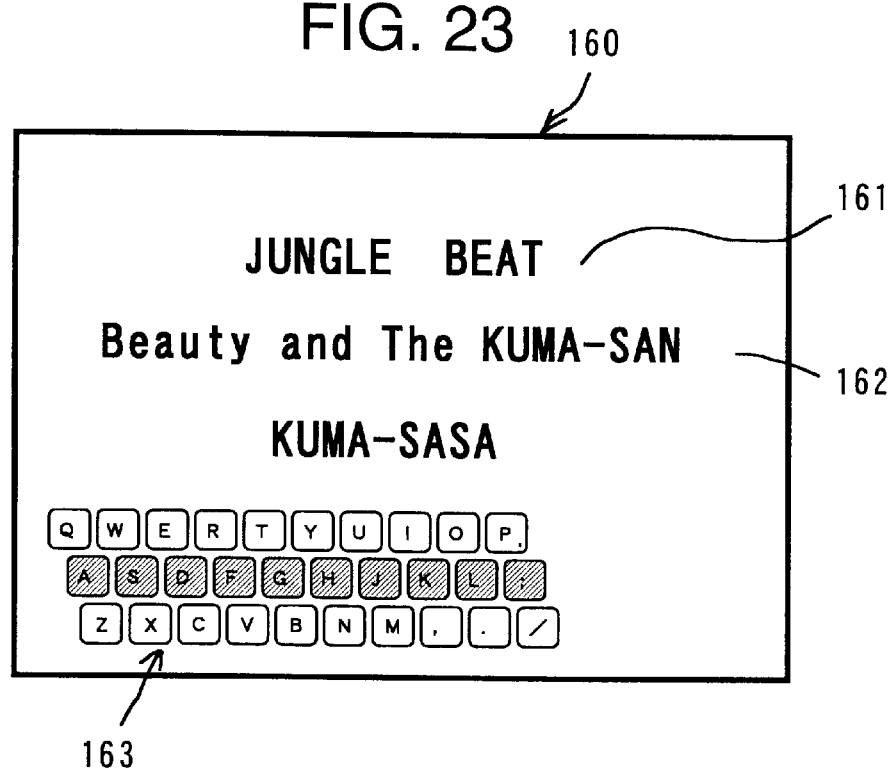
FIG. 23 is a view showing a picture displayed for music introduction when the processing shown in FIG. 16 is executed.

When a music number is determined, the processing is advanced to the step S12 shown in FIG. 16, and preparation for playing a determined music is started. For example, the read head of the CD drive 9 is moved to a performance start position of a selected music, and there is performed processing for loading the game control data (refer to the part (a) of FIG. 13) that corresponds to the selected music from the CD-ROM 15 or HDD 8 in a predetermined region of the RAM 3. Such processing is executed as background processing relevant to the processing shown in FIG. 16. When preparation for play is started, a title picture 160 shown in FIG. 23 is displayed. In the title picture 160, there are displayed an image 163 indicative of a range of keys used in that music together with music information such as a music title 161 of the music selected on the title picture 160, sub-title 162 and the like. In the example shown in FIG. 23, keys of "A" to ";" at the middle stage in the three line keys are used, and thus, only the range is displayed in a mode (contrast, color, pattern and the like) different from that of another portion. In this manner, the user can recognize the difficulty of play (practice) specifically in advance. Information required for displaying this title picture 160 may be contained in the additional information shown in the parts (f) and (g) of FIG. 13, for example, and the information is read prior to display of the title picture 160.

It is judged whether or not a play is ready after display of the title picture 160 (step S14). If the play is ready, a game picture 110A shown in FIG. 5 is displayed (step S15), and the start of reproduction of a selected music number is instructed by the CD drive 9 (step S16). When the music reproduction starts, the picture 110B shown in FIG. 6 is displayed, so that the "word typing" practice may be started in advance. After the music reproduction has been started, the current position in the music is detected (step S17). The current position is a current performance position of the music that is performed as the BGM, and can be specified by using for example, the above mentioned serial number. The current position may be detected based on the sector number currently read by the CD drive 9, or may be detected by initiating a predetermined timer at the start of performance based on the count value.

After the current position has been detected, it is judged whether a time for changing a practice mode from the "key typing" to the "word tying" or vice versa (step S18) comes or not. When the time for changing comes, the practice mode is switched (step S19). In this manner, the game picture is changed from the picture 110A to the picture 110B or vice versa. If the time for changing the practice mode does not come, the step S19 is skipped. At the next step S20, subroutine processing that corresponds to the current position detected at the step S17 is executed. The sub-routine processing to be executed at this time differs depending on which practice mode, i.e. the "key typing" or the "word typing" is currently executed. A detailed description will be given. When processing according to the current position ends, the processing goes to the step S21 at which it is judged whether or not the current position reaches a predetermined end position (step S21). Information for discriminating the end position of the music can be contained in the additional information shown in the part (f) of FIG. 13, for example. Alternatively, a condition may be established in the case where the score displayed at the evaluation display portion 113 is at a predetermined level or less, and when this condition is met, it may be judged that the music has to end even if the music reproduction is in progress.

In the case where it is judged that the music ends at the step S21, the processing is reverted to the step S17. On the other hand, in the case where it is judged that the music ends, a predetermined result display picture is displayed (step S22). Then, the evaluation during the typing practice is summed up (step S23). The summation result is reflected, and the display contents of the result display picture are updated (step S24). Thereafter, it is judged whether or not a predetermined restore operation is performed for the keyboard 5 or the pointing device 6 (step S25). When the restore operation is performed, the processing shown in FIG. 16 is terminated.

Figure 17:
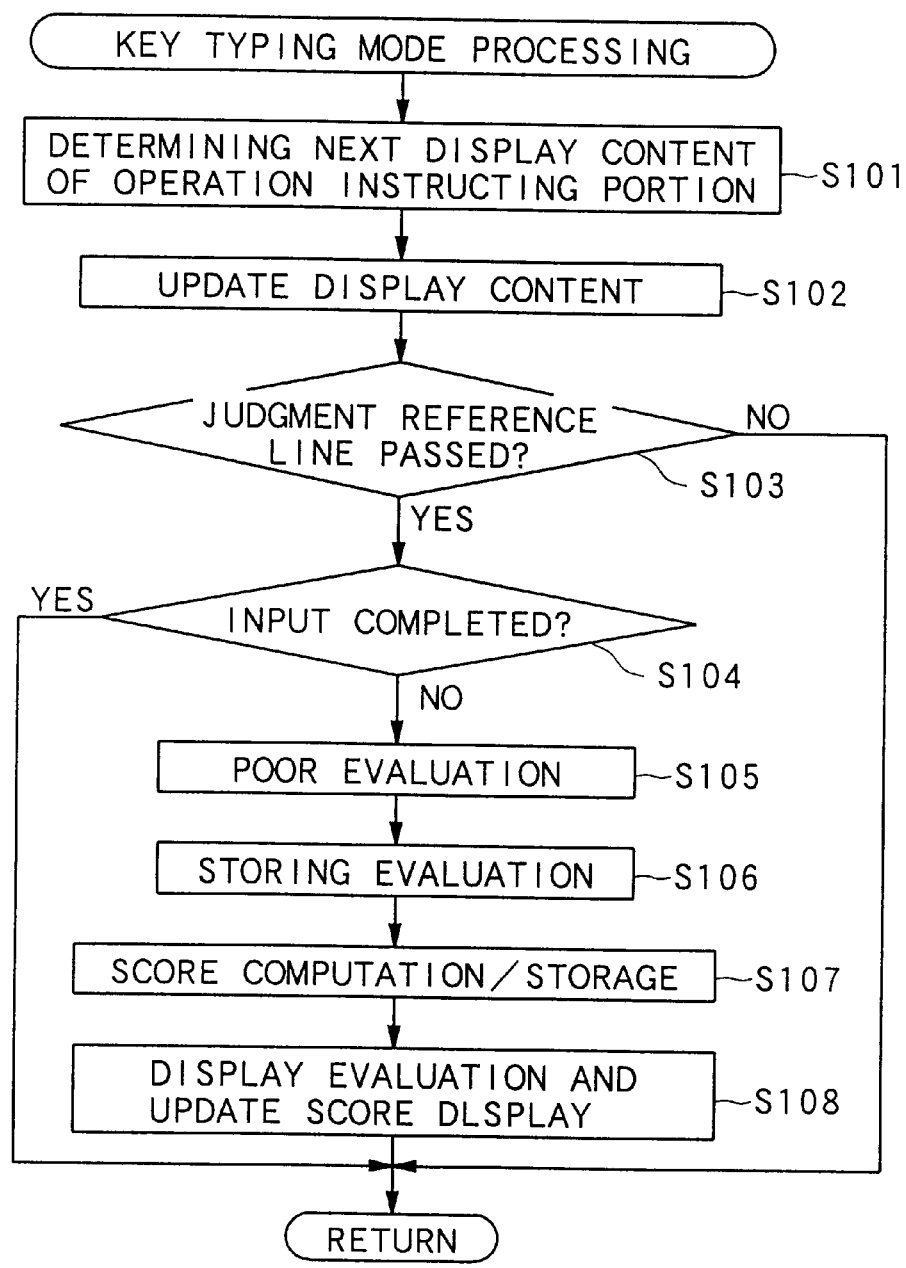
FIG. 17 is a flowchart showing procedures for key typing mode processing executed as subroutine processing shown in FIG. 16.

FIG. 17 shows key typing mode processing executed as subroutine processing of the step S20 shown in FIG. 16 during the "key typing" practice. In this processing, the display contents of the operation instructing portion 111 to be displayed in the next picture 110A are determined based on the current position in the music (step S101). Namely, the display position of the reference mark 131 and the display contents of the character mark 132 corresponding to the reference mark 131 are determined, respectively.

The display position of the reference mark 131 is computed as follows with using the key typing instruction data shown in the part (a) of FIG. 14. The current position in the music is associated with the judgment reference line 123 of the operation instructing portion 111, and the instructive marks 130 included in a predetermined range (for example, corresponding to two bars) defined upward from the line 123 are extracted based on the information on the operation time of the key typing instruction data shown in the part (a) of FIG. 14. The display position concerning the vertical direction of each mark 130 is computed so that a distance in the vertical direction between the judgment reference line 123 and the reference mark 131 is proportional to a time based difference quantity between the current position and the operation time associated with each mark 130. The display position in the transverse direction of each instruction mark 130 may be specified based on a relationship between a key specified by the key typing instruction data and the key assignment data shown in the part (a) of FIG. 13 (the detail is shown in FIG. 15). A character displayed on the character mark 132 is determined based on the information for specifying a key shown in the part (a) of FIG. 14.

After the display contents have been determined, the display of the operation instructing portion 111 is updated in accordance with the determined contents (step S102). Such processing is periodically repeated in accordance with the screen rewriting period, whereby the instructive mark 130 is scrolled as described above. When the processing shown in FIG. 18 does not coincide with the rewrite period of the screen of the display device 11, there may be provided the step of judging whether or not the operation instructing portion 111 should be updated prior to the step S20 shown in FIG. 16, and the step S20 may be executed only when an affirmation judgment is obtained at that step.

Next, it is judged whether or not the instructive mark 130 to be eliminated from the picture 110A passing through the judgment reference line 123 is generated during this processing by using the computation result at the step S101 (step S103). In the case where such mark 130 exists, it is judged whether or not key operation associated with such mark 130 has been inputted (step S104). Information for judging whether or not the mark has been inputted is generated by the processing shown in FIG. 18 described later.

In the case where it is not judged that the mark has been inputted at the step S104, the evaluation corresponding to that mark 130 is recognized as the POOR evaluation (step S105). Next, the evaluation result is stored in the RAM 3 (step S106), the user's score is computed based on the evaluation result, and the computation result is stored in the RAM 3 (step S107). The POOR evaluation means that correct operation has not been made for the mark 130, and thus, the score is decreased. After score computation, the character string of "POOR" corresponding to the POOR evaluation is displayed at a predetermined position of the operation instructing portion 111 (immediately above the judgment reference line 123), and the display contents of the evaluation display portion 113 are updated by reflecting new computation result (step S108). From the foregoing, the processing shown in FIG. 17 is completed.

Figure 18:
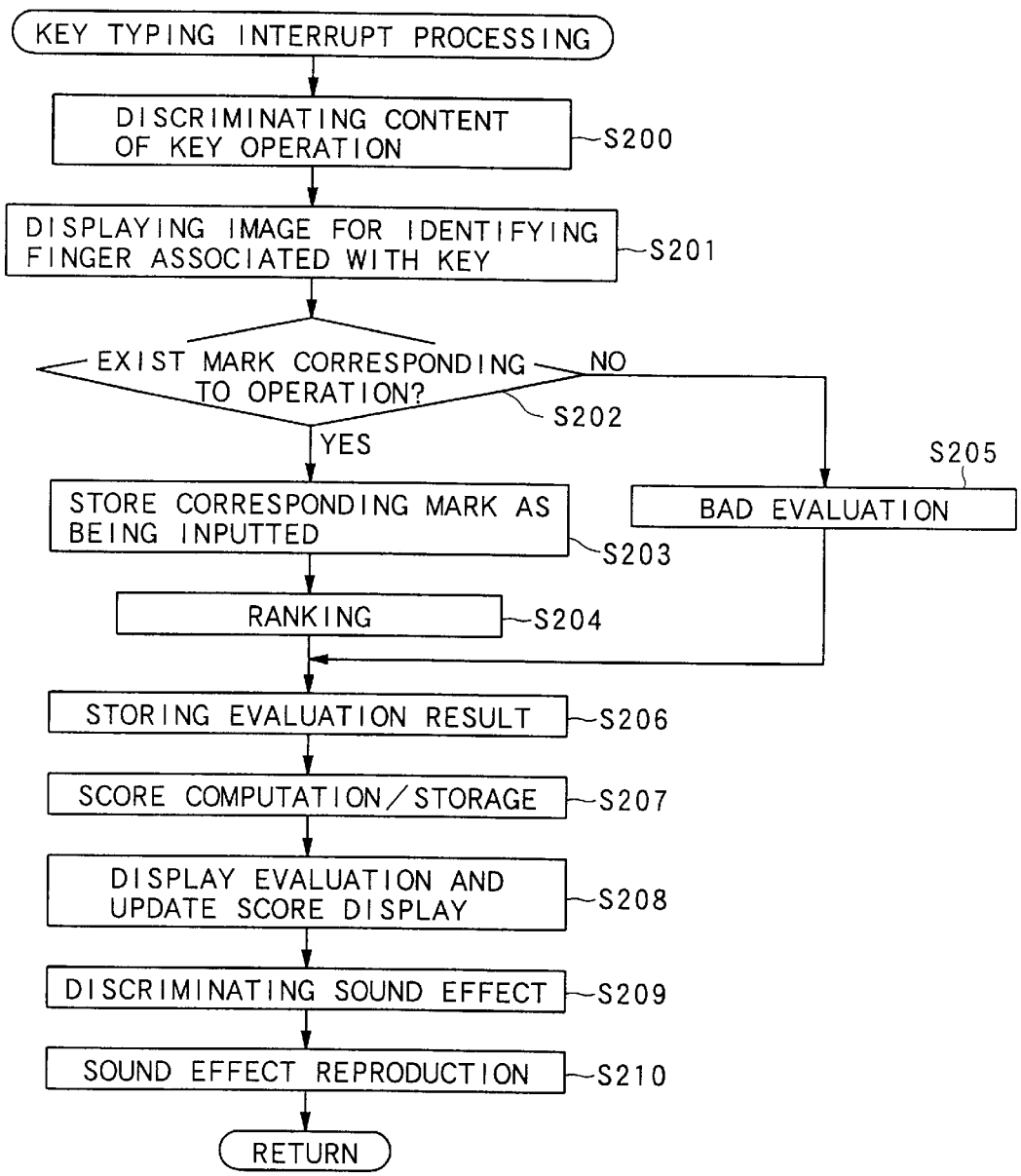
FIG. 18 is a flowchart showing procedures for key typing interrupt processing executed in response to keyboard operation while executing the processing shown in FIG. 16.

FIG. 18 shows key typing processing executed by the CPU of the main control portion 2 in response to a case in which a signal indicative of key operation is outputted from the keyboard 5 during the "key typing practice". In this processing, the contents of the key operation defined as a trigger for starting interrupt processing are discriminated (step S260). Next, an image for causing the user to recognize a finger associated with an operated key is displayed (step S202). For example, among the images 120A to 125I of the fingers, only an image of the finger associated with the discriminated key is dynamically produced, and the movement is expressed so that such finger pushes the key. Of the regions 120A to 120I of the operation instructing portion 111, only a region associated with the operated key may be temporarily displayed in a mode different from that of other regions. With such display, when the key instructive mark 130 in the region 120A almost reaches the judgment reference line 123, for example, if any key of W, S or X to be pressed by the third finger of the left hand is operated incorrectly, any display is performed on the region 120B associated with the third finger of the left hand. Thus, the user can grasp incorrect pressing easily.

Next, it is judged whether or not there exists the instructive mark 130 associated with the key operation defined as a trigger of this processing (step S202). This processing is directed to processing for detecting, from the key typing instruction data shown in FIG. 14, the closest operation time concerning the same key as the actual operated key by referring to the type of the operated key and its actual operation time, and judging whether or not the actual key operation time is included in the evaluation range (refer to FIG. 10) relevant to the detected operation time.

In the case where it is judged that the instructive mark 130 associated at the step S202 exists, the instructive mark 130 is stored to have been inputted (step S203). The instructive mark 130 stored to have been inputted is to be affirmatively judged at the step S104 shown in FIG. 17. At the next step S204, the key operation is ranked as any of the COOL evaluation or the GOOD evaluation based on a difference between the actual operation time and the operation time (corresponding to time to shown in FIG. 10) specific to the instructive mark 130 (step S204). On the other hand, in the case where the step S202 is negatively judged, it is judged as an operation that is not associated with the instructive mark 130, and the BAD evaluation is performed (step S205).

After the key operation has been evaluated at the step S204 or S205, the evaluation result is stored (at the step S206), the score is computed corresponding to the evaluation result, and the score obtained after computed is stored in the RAM 3 (step S207). Further, the evaluation result concerning a rank is displayed at the operation instructive portion 111, and the display contents of the evaluation display portion 113 are updated based on the score after computed (step S208). Then, a sound effect to be outputted corresponding to the key operation is discriminated based on the key typing instruction data shown in the part (a) of FIG. 14 (step S209), and reproduction of the sound effect is instructed at the sound processing portion 12 (refer to FIG. 1) (step S210). From the foregoing, the processing shown in FIG. 18 ends. In the case where the step S202 is affirmatively judged, a sound effect reproduced at the step S210 is a sound effect specified by the key typing instruction data. However, in the case where the step S202 is negatively judged, another proper sound effect is produced. A sound for reading a character assigned to the operated key may be outputted as a sound effect. By doing this, it is possible to discriminate whether or not such key is correctly pressed based on a comparison between the content of pronunciation and a character specified for the character mark 132. When the GOOL or GOOD evaluation is obtained, a sound effect musically harmonized with the BGC is outputted. When the other evaluation is obtained, a sound effect that is not harmonized with such BGM may be outputted.

Figure 19:
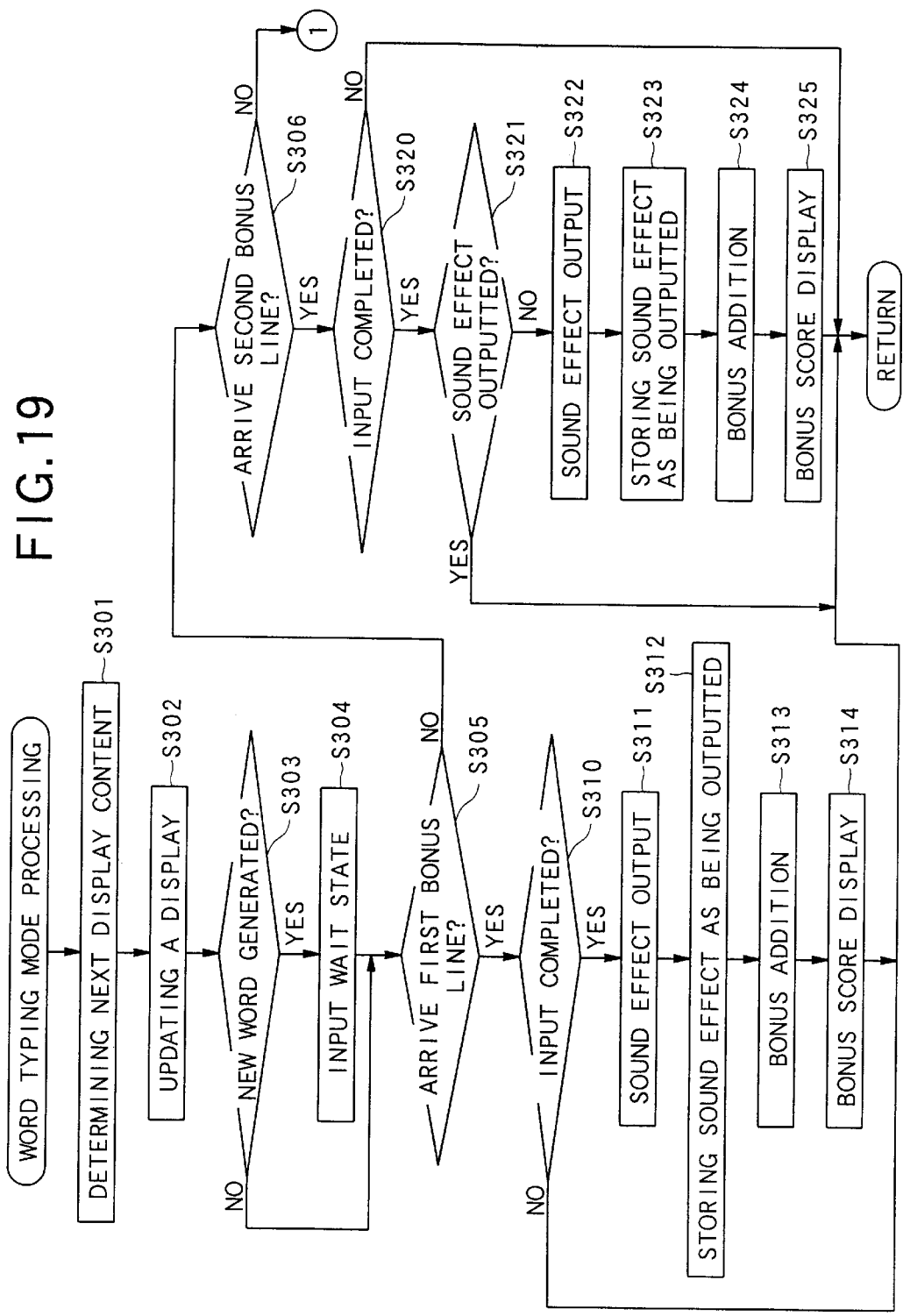
FIG. 19 is a flowchart showing procedures for word typing mode processing executed as subroutine processing shown in FIG. 16.
Figure 20:
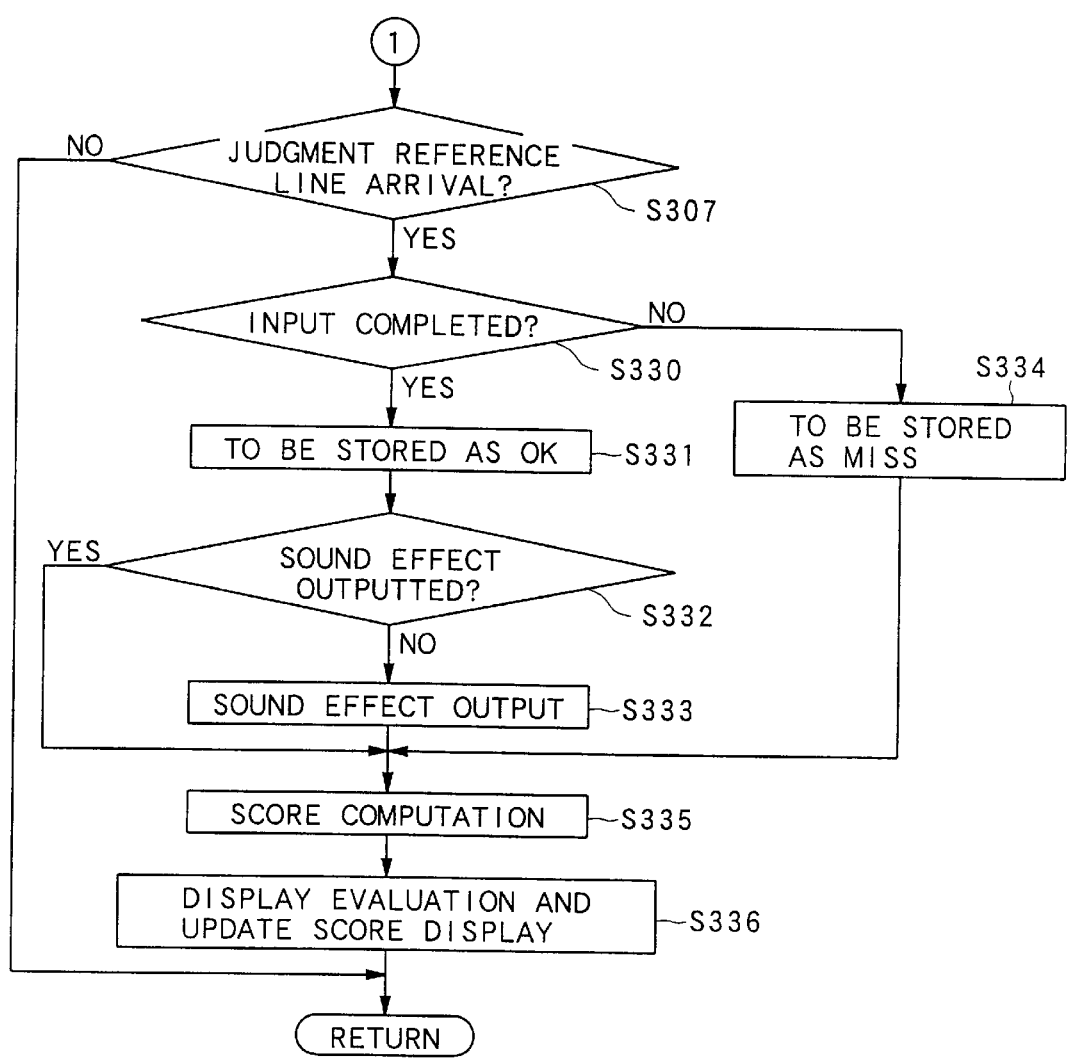
FIG. 20 is a flowchart following FIG. 19.

FIGS. 19 and 20 each showing word mode processing executed as subroutine processing at the step S20 shown in FIG. 16 during the "word typing" practice. In this processing, the display contents of the operation instructive portion 111 on the next picture 110B are first displayed based on the current position in the music (step S301). In this processing, the display position of the reference mark 141 and the content of the word mark 142 that corresponds to the reference mark 141 are determined, respectively.

The display position of the reference mark 141 is computed as follows with using the word typing instruction data shown in the part (b) of FIG. 14. The current position in the music is associated with the judgment reference line 123 of the operation instruction portion 111, and the instructive marks 140 included in a predetermined range (for example, corresponding to two bars) defined upward from the line 123 are extracted based on the information on the operation time of word typing instruction data shown in the part (b) of FIG. 14. Then, the display position concerning the vertical direction of each mark 140 is computed so that the distance in the vertical direction between the judgment reference line 123 and the reference mark 141 is proportional to the time based difference quantity between the current position and the operation time associated with each mark 140. The display position of the instructive mark 140 is fixed to the center of the operation instructing portion 111.

After determining the display contents, the display of the operation instructing portion 111 is updated in accordance with the determined content (step S302). These processing functions are periodically repeated, whereby the instructive mark 140 is scrolled as described above.

Next, it is judged as to whether or not a new word instructive mark 140 is to be appeared in the operation instructing portion 111 by this processing, using the computation result obtained at the step S301 (step S303). When the affirmative judgment is obtained, information (for example, a flag) for identifying the subsequent state, as an input wait state, is stored in the RAM 3 (step S304). In the case where the step S303 is negatively judged, the step S304 is skipped. At the subsequent step S305, it is judged whether or not the reference mark 141 reaches the first bonus line 143. If it is negatively judged, then it is judged whether or not the reference mark 141 reaches the second bonus line 144 at the step S306. If it is further negatively judged, the processing goes to the step S307 shown in FIG. 20, at which it is judged whether or not the reference mark 141 reaches the judgment reference line 123. When the step S307 is negatively judged, this subroutine processing is terminated.

When the step S305 is affirmatively judged, it is judged whether or not the word input instructed by the word mark 142 is completed at this time (step S310). The information for judging whether or not the input is completed is generated by the processing shown in FIG. 21 described later. If the input is not completed, this subroutine processing is terminated. On the other hand, if the input is completed, a predetermined sound effect is outputted (step S311), and information indicating that a sound effect of such word has already been outputted is stored in the RAM 3 (step S312). Then, a predetermine bonus is added (step S313), and the score added as such bonus is displayed at the operation instructing portion 111 (refer to step S314 shown in FIG. 6). The subroutine processing ends after waiting the processing at the step S314.

When the step S306 is affirmatively judged, it is judged whether or not the word input instructed by the word mark 142 has been completed at that time (step S320). If the input is not completed, this subroutine processing is terminated. On the other hand, if the input has been completed, it is judged whether or not a sound effect has been outputted with respect to such word (step S321). If such sound effect has not been outputted, a predetermined sound effect is outputted (step S322), and information indicating that the sound effect of such word has been outputted is stored in the RAM 3 (step S323). Then, a predetermined bonus is added (step S324), and the score added as the bonus is displayed at the operation instructing portion 111 (step S325). After waiting the processing at the step S325, this subroutine processing ends.

When the step S307 shown in FIG. 20 is affirmatively judged, it is judged whether or not the word input instructed by the word mark 142 at that time is completed (step S330). If the input is completed, the operation concerning such word is evaluated as "OK" (step S331), and it is judged whether or not a sound effect has been outputted with respect to the word (step S332). If the sound effect has not been outputted, a predetermined sound effect is outputted (step S333). On the other hand, if it is judged that the input is completed at the step S330, the operation concerning the word is evaluated as "MISS" (step S334).

In the case where an affirmative judgment is obtained at the step S332, the processing at the step S333 or S334 is performed, and then, the processing goes to the step S335. Then, the score is computed according to the evaluation at the step S331 or the S334 (step S335). When the evaluation of OK is obtained, the score is increased. When the evaluation of MISS is obtained, the score is decreased. Subsequently, an image of the character string that corresponds to the evaluation at the step S331 or S334 is displayed at a predetermined position (at the upper center of the judgment reference line 123) of the operation instructing portion 111, and the display contents of the evaluation display portion 113 are updated according to the computation result of the step S335 (step S336). After waiting the processing, this subroutine processing ends.

Figure 21:
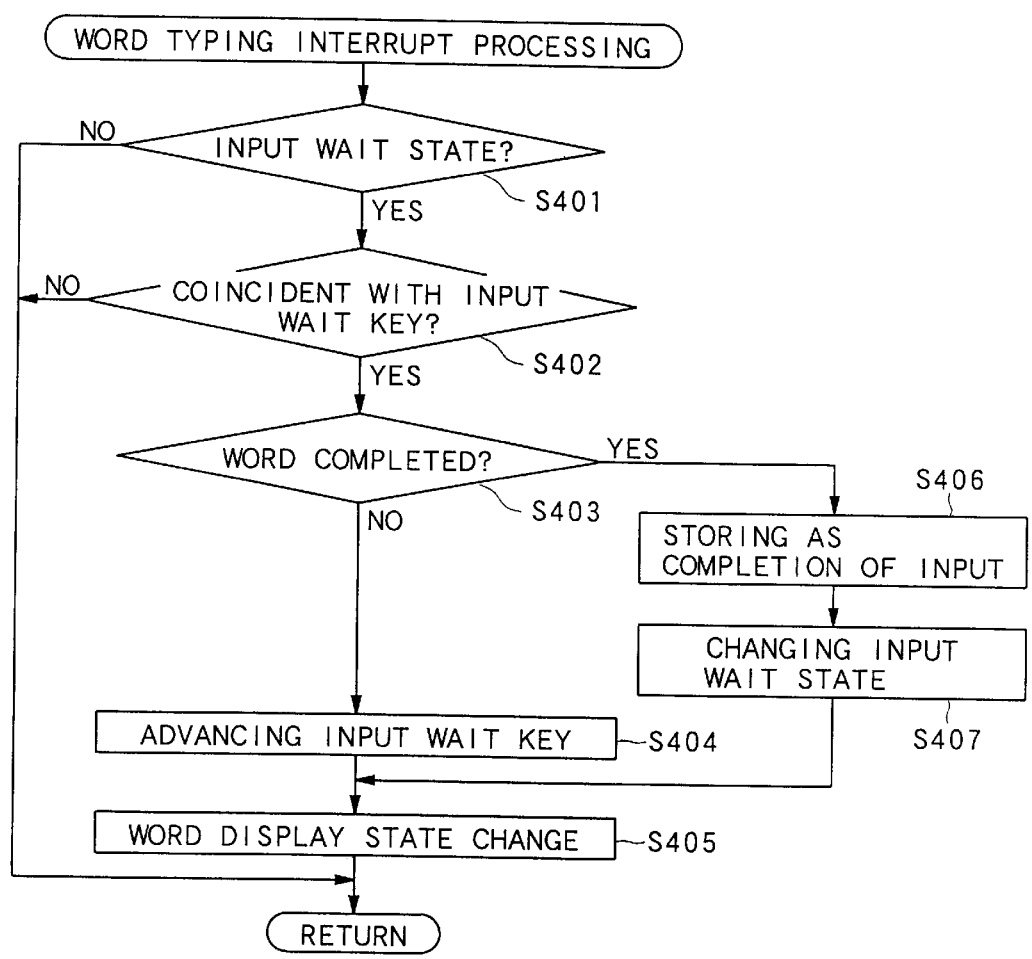
FIG. 21 is a flowchart showing procedures for word typing interrupt processing executed in response to keyboard operation while executing the processing shown in FIG. 16.

FIG. 21 shows word typing interrupt processing executed by the CPU of the main control portion 2 in response to a case in which a signal indicative of key operation is outputted from the keyboard 5 during the "word-typing" practice. In this processing, it is judged whether or not a word typing wait state is currently established (step S401). The input wait state is detected based on the information generated at the step S304 shown in FIG. 19. When the step S401 is negatively judged, the word typing interrupt processing is terminated. On the other hand, when the input wait state is established, it is judged whether or not the operated key is coincident with a word input wait key that is currently waiting for input (step S402). The input wait key is a character displayed at the left-most end excluding the inputted character of a character string that configures a word. In a state in which no character is inputted, the starting character of such word corresponds to an input wait key.

When the operated key is coincident with the input wait key, it is judged whether or not the word input is completed by the key operation (step S403). If such input is not completed, a next character that is not inputted yet is advanced as the input wait key (step S404). On the other hand, in the case where the word input is completed at the step S403, the information indicative of the completion of the input is stored in the RAM 3 (step S406), and the input wait state is eliminated (step S407). After the processing at the step S404 or S407, the processing goes to the step S405 at which the display mode of the inputted character is changed as shown in FIG. 11. The processing shown in FIG. 21 then completes.

Figure 24:
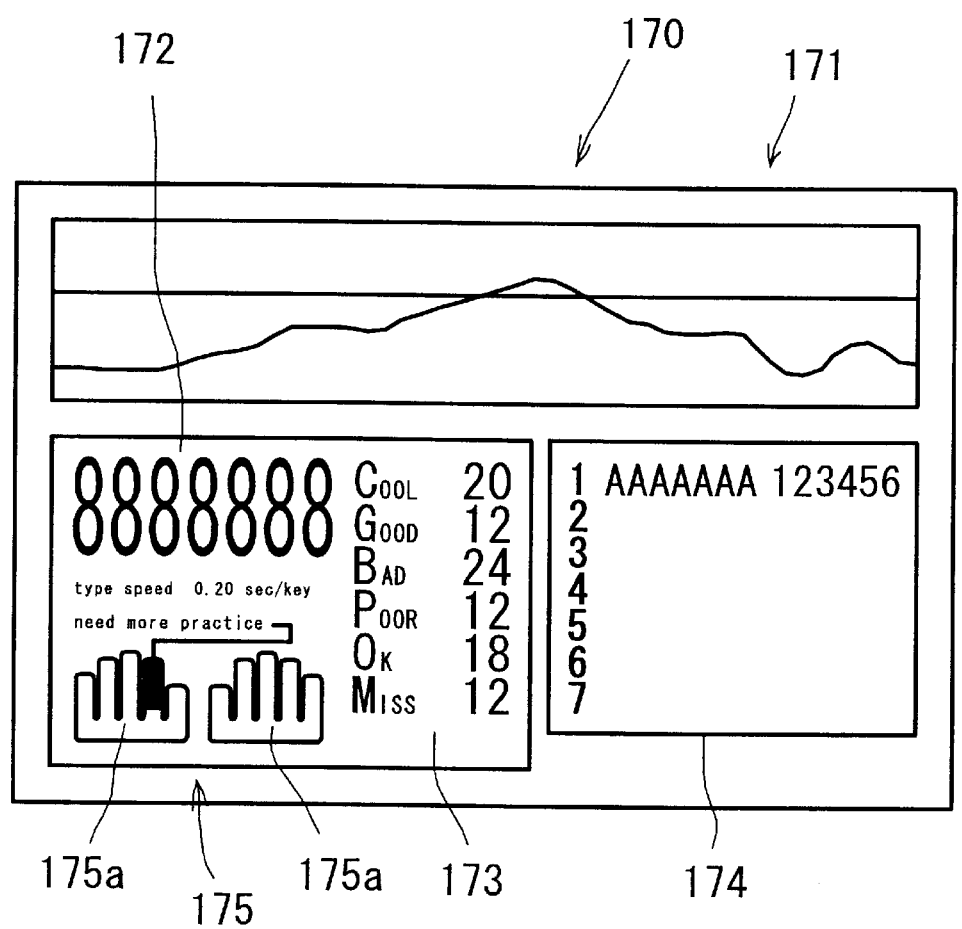
FIG. 24 is a view showing a result display screen displayed at the end of the processing shown in FIG. 16.

The processing shown in FIGS. 17 to 21 is repeatedly executed until the step S21 shown in FIG. 16 is affirmatively judged. FIG. 24 shows an example of the result display picture displayed at the step S22 shown in FIG. 16, corresponding to these processing functions. The result display picture 170 includes a score change display portion 171, a score counter 172, an individual evaluation summation portion 173, a high score display portion 174, and a finger display portion 175. In the RAM 3, there is stored an update history every time the score is updated by the above processing, and the score change from the start to the end of a play is indicated in the score change display portion 171 by a polygonal line with a transverse axis being defined as a time axis. The score counter 172 numerically shows the score at the end of the play. The RAM 3 stores the number of each of the COOL evaluation, the GOOD evaluation, the BAD evaluation and the POOR evaluation counts in the "key typing" practice; and the OK evaluation and the MISS evaluation counts in the "word typing" practice, respectively, and the individual evaluation summation portion 173 displays each summation result of them in a listed manner.

In the processing shown in FIG. 16 to FIG. 21, the evaluation results relevant to the user operation are recorded to be discriminated by each finger. In the case where the key input is requested by a third finger of the right hand by the instructive mark 130, for example, if the operation relevant to that mark 130 is evaluated as "POOR" at the step S105 shown in FIG. 17, such evaluation is stored in the RAM 3 as the POOR evaluation relevant to the operation of the third finger of the right hand. At the step S24 shown in FIG. 16, the evaluation result is summed up for each finger, and the lowest scored finger (COOL evaluation or GOOD evaluation is defined as a right answer) based on the summation result. At the step S25, of the image 175a indicative of both hands displayed at the finger display portion 175 shown in FIG. 24, the display style at a portion that corresponds to the finger judged to be at the lowest score is changed differently from other portions, whereby the lowest scored finger is taught to the user.

In the foregoing, although the processing in the case where the STAGE 3 is selected from the menu picture 100 shown in FIG. 3 has been described, the processing in the case where the STAGE 2 is selected may be performed in conformance with the above. In the case where the STEP 3 shown in FIG. 4 is selected, only processing for the "key typing" practice is executed. In the case where the STEP 4 is selected, only processing for the "word typing" practice is executed. In the case where the STEP 5 is selected, both processing are executed. However, in the STAGE 2, the procedures for selection of music number or display of the evaluation result are eliminated.

The present invention may be carried out in various modes without being limited to the above described embodiments. For example, the configuration of the instructive marks 130 and 140 may be variously modified, for example. A correlation between each finger and each of the instructive regions 120A to 120I may be reset according to user's circumstance. By doing this, the present invention can be used as a tool for further improving self-stylish typing technique relevant to the user familiar with an irregular input method.

In the above embodiment, although the judgment reference line 123 is fixed to the lower end of the operation instructing portion 111, thereby scrolling the instructive marks 130 and 140, the instructive marks 130 and 140 are displayed at a predetermined position of the operation instructive portion 111, and the judgment reference line 123 may be repeatedly scrolled at a predetermined cycle. In this manner, change may be made to perform corresponding input at a time when the judgment reference line 123 and each of the reference marks 131 and 141 are coincident with each other.

As has been described above, according to the present invention, the user can specify easily which operating portion should be operated by which finger through a correlation between an instructive mark and a region. Moreover, through the relative scroll between the instructive mark and the reference mark, the user can grasp a state at which the operation time is gradually close, so that the user can perform a practice in conformance with actual input environment in which the user can continue typing with grasping the future input contents in advance. Therefore, the user can master typing efficiently through the amusement system according to the present invention. By taking a musical element, amusement concerning typing is enhanced, thereby attracting the user's interest strongly. Further, by providing the first practice mode and second practice mode for requesting character and word inputs, respectively, there can be provided more efficient practice environment to the user.

What is claimed is:

1. An amusement system comprising:
   a keyboard having a plurality of keys to be operated for typing, to which specific characters are assigned one by one, the keyboard being capable of outputting a signal that corresponds to an operation state of each of the operating portions;
   a display device capable of displaying an image that corresponds to an inputted video signal; and
   a control device capable of instructing an operation of the keyboard through the display device, wherein the control device comprises:
   a device for displaying on a screen of the display device an operation instructing portion at which a plurality of regions associated with each finger of a user are provided in a visually identifiable mode to instruct operations for each finger;
   a device for displaying in the respective regions an instructive mark for specifying the key to be operated by a finger associated with each of the regions, the instructive mark including a mark indicative of each character assigned to the key to be operated; and
   a device for relatively scrolling the instructive mark and a predetermined reference mark in a predetermined direction, and then, instructing an operation time of the key specified by each instructive mark based on a positional relationship between the instructive mark and the reference mark.

2. The amusement system according to claim 1, wherein the plurality of regions extend in parallel to each other in the predetermined direction on the screen of the display device, and the scroll is performed along the predetermined direction.

3. The amusement system according to claim 2, wherein the predetermined direction is a vertical direction.

4. The amusement system according to claim 1, wherein the plurality of regions extend in parallel to each other in a vertical direction of the screen of the display device, a display position of the reference mark is fixed to a lower end of the operation instructing portion, and the instructive mark is scrolled from the top to the bottom toward the reference mark.

5. The amusement system according to claim 2, wherein the plurality of regions are arranged in a same order as an arrangement order of each finger.

6. The amusement system according to claim 1, wherein an image for identifying a finger associated with each region is included in the plurality of regions, respectively.

7. The amusement system according to claim 1, wherein an image simulating at least tip end of a finger associated with each region is displayed on the plurality of regions, respectively.

8. The amusement system according to claim 1, wherein, when the key of the keyboard is operated, at least a part of a region of said plurality of regions associated with each finger of a user corresponding to the operated key of the plurality of regions is displayed in a mode different from another region.

9. The amusement system according to claim 7, wherein, when the key of the keyboard is operated, the image simulating at least a tip end of the finger displayed in a region that corresponds to the operated key of the plurality of regions is changed.

10. The amusement system according to claim 1, wherein the control device compares an operation to be instructed via the display device with an actual operation of a user to evaluate the operation of the user, and causes the display device to display information indicative of the evaluation result.

11. The amusement system according to claim 10, wherein the control device determines an evaluation for each finger in a predetermined practice range, and causes the display device to display information according to the evaluation.

12. The amusement system according to claim 11, wherein the control device causes the display device to display information for specifying a lowest evaluated finger in the practice range as the information according to the summation result.

13. The amusement system according to claim 1, comprising:
   a sound output device capable of producing a sound that corresponds to an input of a sound signal; and
   a storage medium storing a music number data for reproducing a predetermined music via the sound output device,
   wherein the control device reproduces by the sound output device a music that corresponds to the music number data on the storage medium, and executes the scroll according to a tempo of the music in synchronism with the music.

14. The amusement system according to claim 13, wherein, when the key of the keyboard is operated, the control device superimposes on the music a sound effect to be harmonized therewith, and causes such sound to be outputted from the sound output device.

15. The amusement system according to claim 1, comprising a sound output device capable of producing a sound that corresponds to an input of a sound signal, wherein, when the key of the keyboard is operated, the control device causes the sound output device to output a sound corresponding to a character assigned to the operated key.

16. An amusement system comprising:
   a keyboard having a plurality of keys to which specific characters are assigned one by one, the keyboard being capable of outputting a signal that corresponds to an operation state of each key;
   a display device capable of displaying an image that corresponds to an inputted video signal; and
   a control device capable of instructing an operation of the keyboard through the display device, wherein the control device comprises:
      a device for selecting a first practice mode or a second practice mode in accordance with a predetermined condition;
      a device for, in the case where the first practice mode is selected, displaying on a screen of the display device an operation instructing portion at which a plurality of regions associated with each finger of a user are provided in a visually identifiable mode to instruct operations for each finger;
      a device for displaying in the respective regions an instructive mark for specifying a character to be inputted by a finger associated with each of the regions, one by one;
      a device for relatively scrolling the instructive mark for specifying the character and a predetermined reference mark in a predetermined direction, and then, indicating a time when the character specified for each instructive mark is to be inputted based on a positional relationship between the instructive mark and the reference mark;
      a device for, in the case where the second practice mode is selected, displaying on the screen of the display device an instructive mark for specifying a word to be inputted by operating a key of the keyboard several times; and
      a device for relatively scrolling an indicative mark for specifying the word and a predetermined reference mark in a predetermined direction, and then, indicating a time limit by when the word specified by the instructive mark is to be inputted based on a positional relationship between the instructive mark and the reference mark.

17. The amusement system according to claim 16, wherein the instructive mark for specifying the character and the instructive mark for specifying the word are respectively scrolled in a vertical direction of the screen of the display device.

18. The amusement system according to claim 16, comprising:
   a sound output device capable of producing a sound that corresponds to an input of a sound signal; and
   a storage medium storing a music number data for reproducing a predetermined music via the sound output device,
   wherein, in each of the first practice mode and the second practice mode, a music corresponding to the music number data on the storage medium is reproduced by the sound output device, and the scroll is executed according to a tempo of the music in synchronism with the reproduction of the music.

19. The amusement system according to claim 18, wherein the first practice mode and the second practice mode are switched to each other during reproduction of one music number.

20. A computer readable storage medium applied to an amusement system configured as a computer that comprises:
   a keyboard having a plurality of keys to be operated for typing, to which specific characters are assigned one by one, the keyboard being capable of outputting a signal that corresponds to an operation state of each key;
   a display device capable of displaying an image that corresponds to an inputted video signal; and
   a control device capable of instructing an operation of the keyboard through the display device, wherein a program is recorded to cause the control device to execute the steps of:
      displaying on a screen of the display device an operation instructing portion at which a plurality of regions associated with each finger of a user are provided in a visually identifiable mode to instruct operations for each finger;
      displaying in the respective regions an instructive mark for specifying the key to be operated by a finger associated with each of the regions, the instructive mark including a mark indicative of each character assigned to the key to be operated; and relatively scrolling the instructive mark and a predetermined reference mark in a predetermined direction, and then, indicating an operation time of the key specified by each instructive mark based on a positional relationship between the instructive mark and the reference mark.

21. A computer readable storage medium applied to an amusement system configured as a computer that comprises:
a keyboard an input device having a plurality of keys to which specific characters are assigned one by one, the keyboard being capable of outputting a signal that corresponds to an operation state of each key;
a display device capable of displaying an image that corresponds to an inputted video signal; and
a control device capable of instructing an operation of the keyboard through the display device, wherein a program is recorded to cause the control device to execute the steps of:
selecting a first practice mode or a second practice mode in accordance with a predetermined condition;
displaying, in the case where the first practice mode is selected, on a screen of the display device an operation instructing portion at which a plurality of regions associated with each finger of a user are provided in a visually identifiable mode to instruct operations for each finger;
displaying in the respective regions an instructive mark for specifying a character to be inputted by a finger associated with each of the regions, one by one;
relatively scrolling an instructive mark for specifying the character and a predetermined reference mark in a predetermined direction, and then, indicating a time when a character specified for each instructive mark is to be inputted based on a positional relationship between the instructive mark and the reference mark;
displaying, in the case where the second practice mode is selected, on the screen of the display device an instructive mark for specifying a word to be inputted by operating a key of the keyboard several times; and
relatively scrolling the instructive mark for specifying the word and a predetermined reference mark in a predetermined direction, and then, indicating a time limit by when the word specified by the instructive mark is to be inputted based on a positional relationship between the instructive mark and the reference mark.

22. A typing practice system comprising:
a keyboard having a plurality of keys to be operated for typing, to which specific characters are assigned one by one the keyboard being capable of outputting a signal that corresponds to an operation state of each key;
a display device capable of displaying an image that corresponds to an inputted video signal; and
a control device capable of instructing an operation of the keyboard through the display device, characterized in that the control device comprises:
a device for displaying on a screen of the display device an operation instructing portion at which a plurality of regions associated with each finger of a user are provided in a visually identifiable mode to instruct operations for each finger;
a device for displaying in the respective regions an instructive mark for specifying the key to be operated by a finger associated with each of the regions, the instructive mark including a mark indicative of each character assigned to the key to be operated; and
a device for relatively scrolling the instructive mark and a predetermined reference mark in a predetermined direction, and then, indicating an operation time of the key specified by each instructive mark based on a positional relationship between the instructive mark and the reference mark.

23. A typing practice system comprising:
a keyboard having a plurality of keys to which specific characters are assigned one by one, the keyboard being capable of outputting a signal that corresponds to an operation state of each key;
a display device capable of displaying an image that corresponds to an inputted video signal; and
a control device capable of instructing an operation of the keyboard through the display device, wherein the control device comprises:
a device for selecting a first practice mode or a second practice mode in accordance with a predetermined condition;
a device for, in the case where the first practice mode is selected, displaying on a screen of the display device an operation instructing portion at which a plurality of regions associated with each finger of a user are provided a visually identifiable mode to instruct operations for each finger;
a device for displaying in the respective regions an instructive mark for specifying a character to be inputted by a finger associated with each of the regions, one by one;
a device for relatively scrolling the instructive mark for specifying the character and a predetermined reference mark in a predetermined direction, and then, indicating a time when the character specified for each instructive mark is to be inputted based on a positional relationship between the instructive mark and the reference mark;
a device for, in the case where the second practice mode is selected, displaying on the screen of the display device an instructive mark for specifying a word to be inputted by operating a key of the keyboard several times; and
a device for relatively scrolling the instructive mark for specifying the word and a predetermined reference mark in a predetermined direction, and then indicating a time limit by when the word specified by the instructive mark is to be inputted based on a positional relationship between the instructive mark and the reference mark.

24. An amusement system comprising:
a keyboard receiving input from an operator and outputting a keyboard signal corresponding to the received input;
a display device displaying an image corresponding to the keyboard signal; and
a control device instructing an operation of the keyboard through the display device, said control device including:
a first device displaying an the display device an operation instructing portion at which a plurality of regions individually associated wit a respective finger of the operator are provided in a visually identifiable mode to instruct operations for each respective finger;
a second device respectively displaying in the regions an instructive mark for specifying the key to be operated by a finger associated with each of the regions, the instructive mark including a mark indicative of each character assigned to the key to be operated; and
a third device relatively scrolling the instructive mark and a predetermined reference mark in a predetermined direction, and then, instructing an operation time of the key specified by each instructive mark based on a positional relationship between the instructive mark and the reference mark.

25. The amusement system according to claim 24, wherein the plurality of regions extend in parallel to each other in the predetermined direction on the screen of the display device, and the scroll is performed along the predetermined direction.

26. The amusement system according to claim 25, wherein the predetermined direction is a vertical direction.

27. The amusement system according to claim 24, wherein the plurality of regions extend in parallel to each other in a vertical direction of the screen of the display device, a display position of the reference mark is fixed to a lower end of the operation instructing portion, and the instructive mark is scrolled from the top to the bottom toward the reference mark.

28. The amusement system according to claim 25, wherein the plurality of regions are arranged in a same order as an arrangement order of each finger.

29. The amusement system according to claim 24, wherein an image for identifying a finger associated with each region is included in the plurality of regions, respectively.

30. The amusement system according to claim 24, wherein an image simulating at least tip end of a finger associated with each region is displayed on the plurality of regions, respectively.

31. The amusement system according to claim 24, wherein, when a key of the keyboard is operated, at least a part of a region of said plurality of regions associated with each finger of a user corresponding to the operated key of the plurality of regions is displayed in a mode different from another region.

32. The amusement system according to claim 30, wherein, when a key of the keyboard is operated, the image simulating at least a tip end of the finger displayed in a region that corresponds to the operated key of the plurality of regions is changed.

33. The amusement system according to claim 24, wherein the control device compares an operation to be instructed via the display device with an actual operation of a user to evaluate the operation of the user, and causes the display device to display information indicative of the evaluation result.

34. The amusement system according to claim 33, wherein the control device determines an evaluation for each finger in a predetermined practice range, and causes the display device to display information according to the evaluation.

35. The amusement system according to claim 34, wherein the control device causes the display device to display information for specifying a lowest evaluated finger in the practice range as the information according to the summation result.

36. The amusement system according to claim 24, comprising:
a sound output device producing a sound that corresponds to an input of a sound signal; and
a storage medium storing a music number data for reproducing a predetermined music via the sound output device,
wherein the control device reproduces by the sound output device a music that corresponds to the music number data on the storage medium, and executes the scroll according to a tempo of the music in synchronism with the music.

37. The amusement system according to claim 36, wherein, when a key of the keyboard is operated the control device superimposes on the music a sound effect to be harmonized therewith, and causes such sound to be outputted from the sound output device.

38. The amusement system according to claim 24, further comprising a sound output device for producing a sound that corresponds to an input of a sound signal, wherein, when the key of the keyboard is operated, the control device causes the sound output device to output a sound corresponding to a character assigned to the operated key.

39. An amusement system comprising:
a keyboard receiving input from an operator and outputting a keyboard signal corresponding to the received input;
a display device displaying an image corresponding to the keyboard signal; and
a control device instructing an operation of the keyboard through the display device, said control device including:
a first device selecting a first practice mode or a second practice mode in accordance with a predetermined condition;
a second device, in the case where the first practice mode is selected, displaying on the display device an operation instructing portion at which a plurality of regions individually associated with a respective finger of the operator are provided in a visually identifiable mode to instruct operations for each respective finger;
a third device respectively displaying in the regions an instructive mark for specifying a character to be inputted by a finger associated with each of the regions, one by one;
a fourth device relatively scrolling the instructive mark for specifying the character and a predetermined reference mark in a predetermined direction, and then, indicating a time when the character specified for each instructive mark is to be inputted based on a positional relationship between the instructive mark and the reference mark;
a fifth device, in the case where the second practice mode is selected, displaying on the display device an instructive mark for specifying a word to be inputted by operating a key of the keyboard several times; and
a sixth device for relatively scrolling an indicative mark for specifying the word and a predetermined reference mark in a predetermined direction, and then, indicating a time limit by when the word specified by the instructive mark is to be inputted based on a positional relationship between the instructive mark and the reference mark.

40. The amusement system according to claim 39, wherein the instructive mark for specifying the character and the instructive mark for specifying the word are respectively strolled in a vertical direction of the screen of the display device.

41. The amusement system according to claim 39, further comprising:
a sound output device producing a sound that corresponds to an input of a sound signal; and
a storage medium storing a music number data for reproducing a predetermined music via the sound output device,
wherein, in each of the first practice mode and the second practice mode, a music corresponding to the music number data on the storage medium is reproduced by the sound output device, and the scroll is executed according to a tempo of the music in synchronism with the reproduction of the music.

42. The amusement system according to claim 41, wherein the first practice mode and the second practice mode are switched to each other during reproduction of one music number.

43. A computer readable storage medium applied to an amusement system configured as a computer that comprises:

a keyboard receiving input from an operator and outputting a keyboard signal corresponding to the received input;

a display device displaying an image corresponding to the keyboard signal; and a control device instructing an operation of the keyboard through the display device, wherein a program is recorded to cause the control device to execute the steps of:

displaying on the display device an operation instructing portion at which a plurality of regions individually associated with a respective finger of the operator are provided in a visually identifiable mode to instruct operations for each finger;

respectively displaying in the regions an instructive mark for specifying the key to be operated by a finger associated with each of the regions, the instructive mark including a mark indicative of each character assigned to the key to be operated; and relatively scrolling the instructive mark and a predetermined reference mark in a predetermined direction, and then, indicating an operation time of the key specified by each instructive mark based on a positional relationship between the instructive mark and the reference mark.

44. A computer readable storage medium applied to an amusement system configured as a computer that comprises:

a keyboard for receiving input from an operator and outputting a keyboard signal corresponding to the received input;

a display device displaying an image that corresponds to the keyboard signal; and a control device instructing an operation of the keyboard through the display device, wherein a program is recorded to cause the control device to execute the steps of:

selecting a first practice mode or a second practice made in accordance with a predetermined condition;

displaying, in the case where the first practice mode is selected, on the display device an operation instructing portion at which a plurality of regions individually associated with each respective finger of the operator are provided in a visually identifiable mode to instruct operations for each finger;

respectively displaying in the regions an instructive mark for specifying a character to be inputted by a finger associated with each of the regions, one by one;

relatively scrolling an instructive mark far specifying the character and a predetermined reference mark in a predetermined direction, and then, indicating a time when a character specified for each instructive mark is to be inputted based on a positional relationship between the instinctive mark and the reference mark;

displaying, in the case where the second practice mode is selected, on the display device an instructive mark for specifying a word to be inputted by operating a key of the keyboard several times; and relatively scrolling the instructive mark for specifying the word and a predetermined reference mark in a predetermined direction, and then, indicating a time limit by when the word specified by the instructive mark is to be inputted based on a positional relationship between the instructive mark and the reference mark.

45. A typing practice system comprising:

a keyboard receiving input rom an operator and outputting a keyboard signal corresponding to the received input;

a display device displaying an image corresponding to the keyboard signal; and a control device instructing an operation of the keyboard through the display device, said control device including:

a first device for displaying on the display device an operation instructing portion at which a plurality of regions individually associated with each respective finger of the operator are provided in a visually identifiable mode to instruct operations for each finger;

a second device respectively displaying in the regions an instructive mark for specifying a key to be operated by a finger associated with each of the regions, the instructive mark including a mark indicative of each character assigned to the key to be operated; and a third device relatively scrolling the instructive mark and a predetermined reference mark in a predetermined direction, and then, indicating an operation time of the key specified by each instructive mark based on a positional relationship between the instructive mark and the reference mark.

46. A typing practice system comprising:

a keyboard for receiving input from an operator and outputting a keyboard signal corresponding to the received input;

a display device displaying an image corresponding to the keyboard signal; and a control device instructing an operation of the keyboard through the display device, said control device including:

a first device for selecting a first practice mode or a second practice mode in accordance with a predetermined condition;

a second device, in the case where the first practice mode is selected, displaying on the display device an operation instructing portion at which a plurality of regions individually associated with each respective finger of the operator are provided a visually identifiable made to instruct operations for each finger;

a third device respectively displaying in the regions an instructive mark for specifying a character to be inputted by a finger associated with each of the regions, one by one;

a fourth device relatively scrolling the instructive mark for specifying the character and a predetermined reference mark in a predetermined direction, and then, indicating a time when the character specified for each instructive mark is to be inputted based on a positional relationship between the instructive mark and the reference mark;

a fifth device, in the case where the second practice mode is selected, displaying on the display device an instructive mark for specifying a word to be inputted by operating a key of the keyboard several times; and a sixth device relatively scrolling the instructive mark for specifying the word and a predetermined reference mark in a predetermined direction, and then indicating a time limit by when the word specified by the instructive mark is to be inputted based on a positional relationship between the instructive mark and the reference mark.

* * * * *